(12) United States Patent
Torisaki et al.

(10) Patent No.: US 8,384,945 B2
(45) Date of Patent: Feb. 26, 2013

(54) PRINTING APPARATUS, DATA GENERATION APPARATUS, PRINTING METHOD, DATA GENERATION METHOD, AND STORAGE MEDIUM

(75) Inventors: Atsushi Torisaki, Yokohama (JP); Hironobu Kitabatake, Tokyo (JP); Hiroyuki Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 830 days.

(21) Appl. No.: 12/203,810

(22) Filed: Sep. 3, 2008

(65) Prior Publication Data
US 2009/0059300 A1 Mar. 5, 2009

(30) Foreign Application Priority Data
Sep. 4, 2007 (JP) .................................. 2007-229392

(51) Int. Cl.
*G06K 15/00* (2006.01)
*G06F 3/12* (2006.01)

(52) U.S. Cl. ...................... 358/1.18; 358/1.1; 358/1.13

(58) Field of Classification Search .................. 358/1.13, 358/1.1, 1.18
See application file for complete search history.

(56) References Cited

U.S. PATENT DOCUMENTS
6,476,925 B2 * 11/2002 Nguyen et al. ............... 358/1.13
7,630,582 B2 * 12/2009 Clark et al. ................... 382/291

FOREIGN PATENT DOCUMENTS
JP 2006-243894 9/2006
JP 2006-243894 A 9/2006

* cited by examiner

*Primary Examiner* — Charlotte M Baker
*Assistant Examiner* — Justin Katzwhite
(74) *Attorney, Agent, or Firm* — Canon USA Inc IP Division

(57) ABSTRACT

A printing apparatus includes a determination unit configured to determine whether objects overlap one another by analyzing print data, and a printing unit configured, if it is determined by the determination unit that the objects overlap one another, to separately print an image obtained before the objects overlap one another and an image obtained after the objects overlap one another based on the print data, and if it is determined by the determination unit that the objects do not overlap one another, to print an image based on the print data.

12 Claims, 12 Drawing Sheets

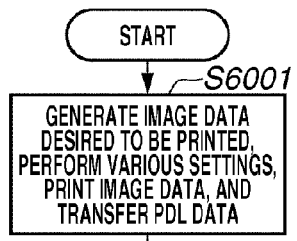
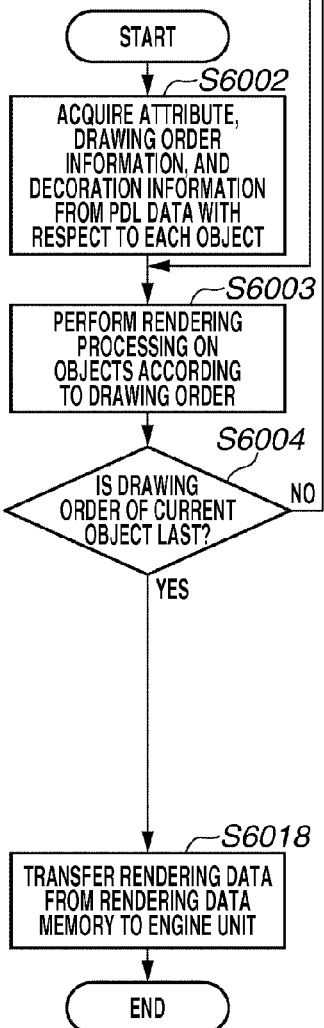
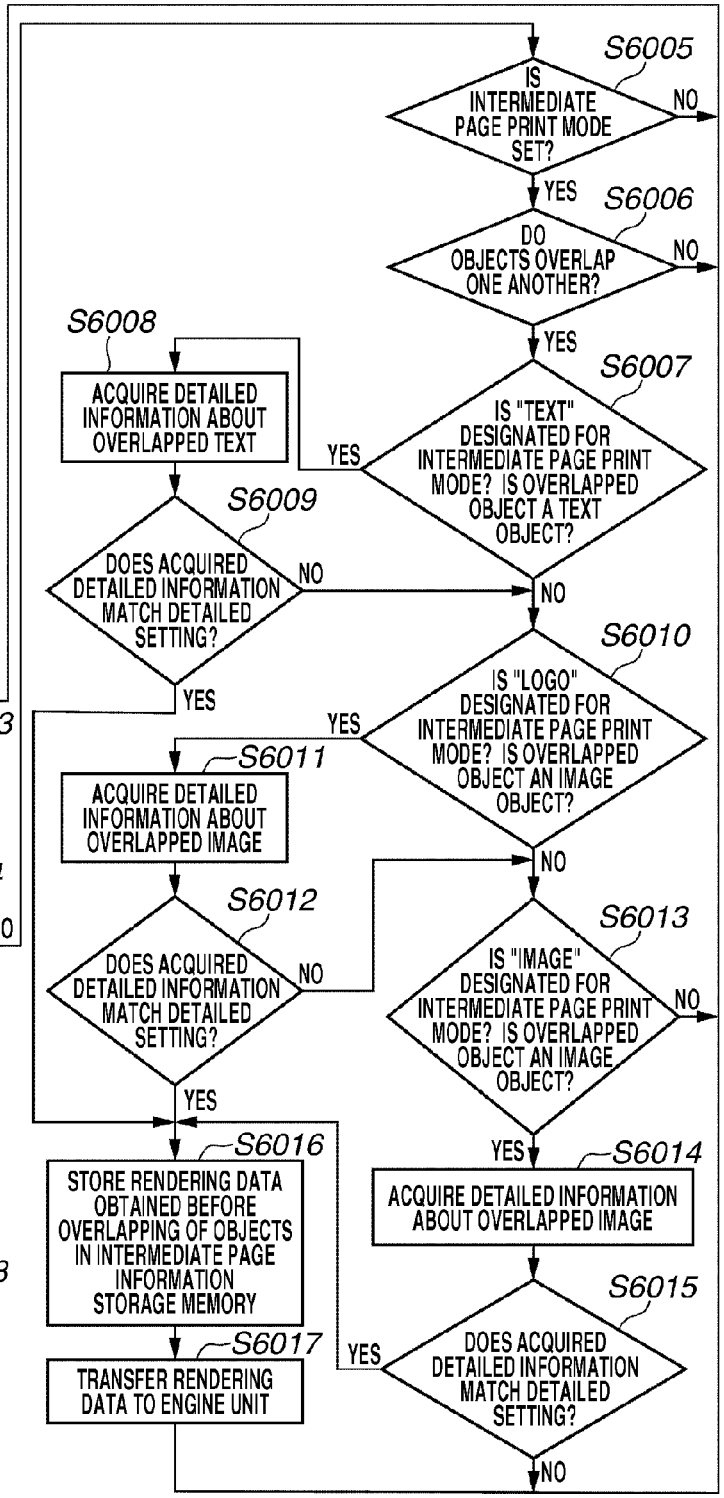

FIG.7

Cxxxx Xx Cxxxx UFR PRINT SETTING

| PAGE SETTINGS | FINISHING | PAPER FEED | PRINT QUALITY |

FAVORITES(F): STANDARD SETTING ▼   OUTPUT METHOD(M): PRINT ▼

PURPOSE OF PRINTING(O):
GENERAL
CAD

[DETAILED SETTINGS(S)...]

GENERAL-PURPOSE MODE SUITABLE TO PRINTING GENERAL DOCUMENTS.

*9001*  *9002*  *9003*
INTERMEDIATE PAGE PRINT MODE   DESIGNATE PAGES   [DETAILED SETTINGS(S)...]

*9004* — ■ PRINT OVERWRITTEN AND INVISIBLE OBJECT
*9005* — ☐ CONVERT OVERWRITTEN AND INVISIBLE OBJECT INTO PDF

[VERIFY SETTINGS(V)...]   COLOR MODE(C): COLOR/MONOCHROMATIC AUTO CHANGE ▼

☐ COLOR SETTINGS ON(L)   [SET COLOR SETTINGS(T)...]

[VERSION INFORMATION(B)]   [RESTORE DEFAULT SETTINGS(R)]

[OK]   [CANCEL]   [APPLY(A)]   [HELP]

FIG.12

STORAGE MEDIUM SUCH AS FD/CD-ROM

| DIRECTORY INFORMATION |
|---|
| PROGRAM CODE CORRESPONDING TO STEPS IN FLOW CHART OF FIGS. 4A AND 4B |
| PROGRAM CODE CORRESPONDING TO STEPS IN FLOW CHART OF FIGS. 6A AND 6B |
| PROGRAM CODE CORRESPONDING TO STEPS IN FLOW CHART OF FIGS. 10A AND 10B |
| |
| |
| |
| |

PRINTING APPARATUS, DATA GENERATION APPARATUS, PRINTING METHOD, DATA GENERATION METHOD, AND STORAGE MEDIUM

BACKGROUND OF THE INVENTION

1. Field of the Invention

The present invention relates to a printing apparatus and a data generation apparatus configured to analyze print data and print the analyzed data or generate data based on a result of the analysis on the data.

2. Description of the Related Art

In generating page information including a plurality of objects that overlap one another, a conventional information processing apparatus or a conventional image forming apparatus performs drawing processing according to a drawing order of the plurality of objects. In this case, an object whose drawing order is earlier is overwritten with an object whose drawing order is later. Accordingly, the object information overwritten by the information processing apparatus or the image forming apparatus may not be visualized.

In particular, in the case of printing application data generated using an animation function of PowerPoint® of Microsoft Corporation, the application data is printed in a state where an object set in the animation overlaps another object. Accordingly, the information about the object to be overwritten with the object set in the animation may not be printed.

In order to solve this problem, a conventional method describes animation information in a page description language (PDL) for each object, as well as describing a drawing order and an attribute therein.

For example, Japanese Patent Application Laid-Open No. 2006-243894 discusses a method for printing both an intermediate page, in which the object is not yet overwritten with an animation object, and a final page, in which the object has already been overwritten with an animation object.

However, the conventional method has the following disadvantages.

That is, in order to solve the above-described problems, it is necessary to acquire animation information from each application and reflect the acquired animation information in a PDL. Furthermore, in this regard, it is necessary to output and add, to each object, information indicating that the object is set in an animation object, for example, to each application as associated information for each object.

Furthermore, it is necessary to reflect the information in a PDL for each object within a driver per each type of PDL to be used. That is, it is necessary that each document generation application and a plurality of drivers comply with the method.

Furthermore, in the case of printing an output from each application after converting the output into a portable document format (PDF), animation information may be lost at the time of converting the output into a PDF. In this case, animation information cannot be acquired from the PDF. Accordingly, this conventional method cannot solve the above-described problems.

Furthermore, the conventional method performs processing on an object regardless of content of the object that has been overwritten with an animation object and thus is not visualized. Accordingly, the conventional method may print page information that is not desired by a user to be visualized.

SUMMARY OF THE INVENTION

The present invention is directed to a method for outputting an image of each of objects obtained before and after overwriting in the case of outputting an image including a plurality of objects overlapping one another.

Furthermore, the present invention is directed to store data of each of objects obtained before and after overwriting in the case of converting data including a plurality of objects overlapping one another into specific data and storing the converted data.

According to an aspect of the present invention, a printing apparatus includes a determination unit configured to determine whether objects overlap one another by analyzing print data, and a printing unit configured, if it is determined by the determination unit that the objects overlap one another, to separately print an image obtained before the objects overlap one another and an image obtained after the objects overlap one another based on the print data, and, if it is determined by the determination unit that the objects do not overlap one another, to print an image based on the print data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

Figure 4:
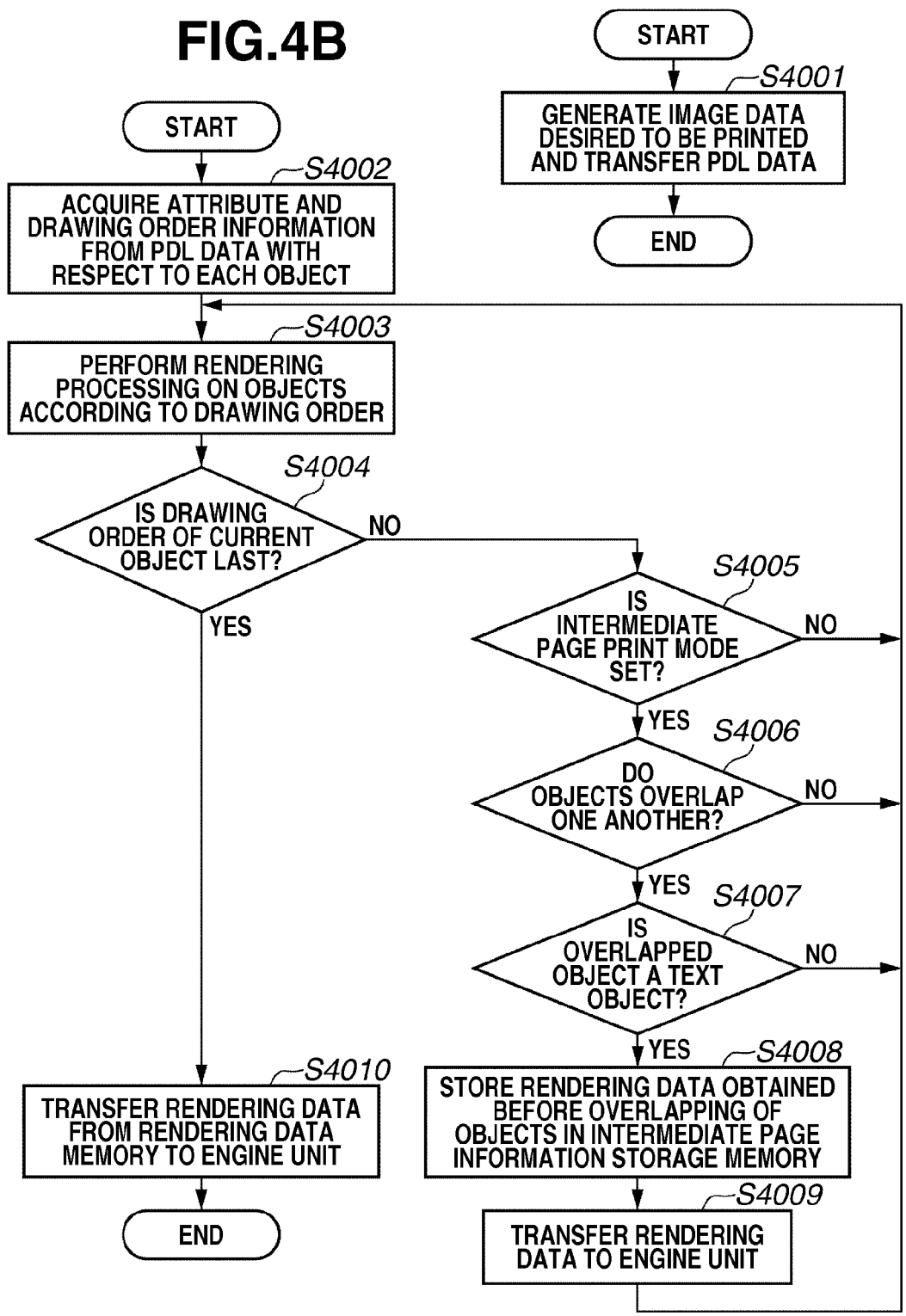

Each of FIGS. 4A and 4B is a flow chart illustrating an example of a flow of data processing performed in the image forming system according to an exemplary embodiment of the present invention.

Figure 5:
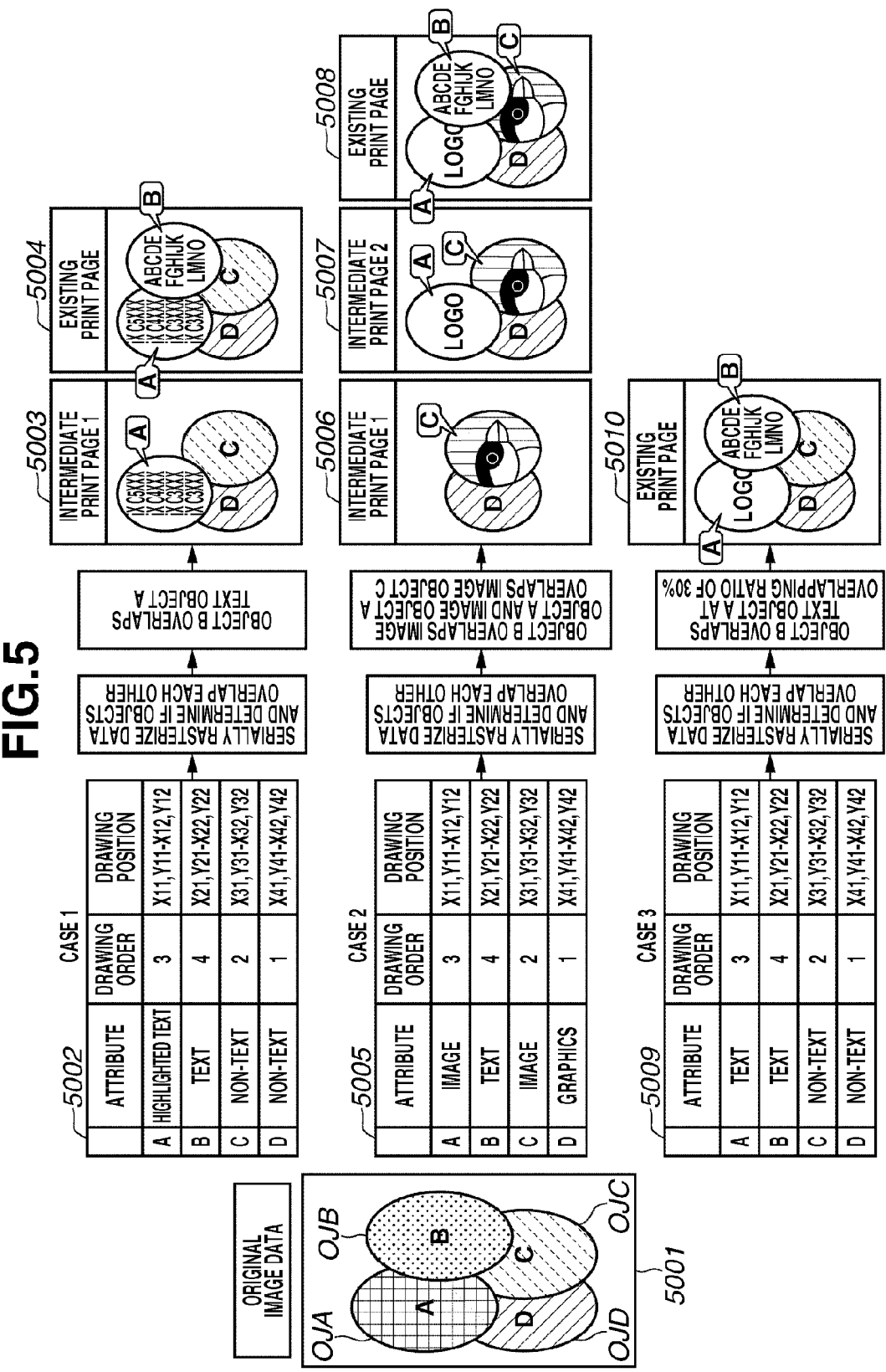

FIG. 5 illustrates an example of a flow of drawing processing on objects performed by the image forming apparatus according to an exemplary embodiment of the present invention.

Each of FIGS. 6A and 6B is a flow chart illustrating an example of a flow of data processing performed in the image forming system according to an exemplary embodiment of the present invention.

Figure 1:
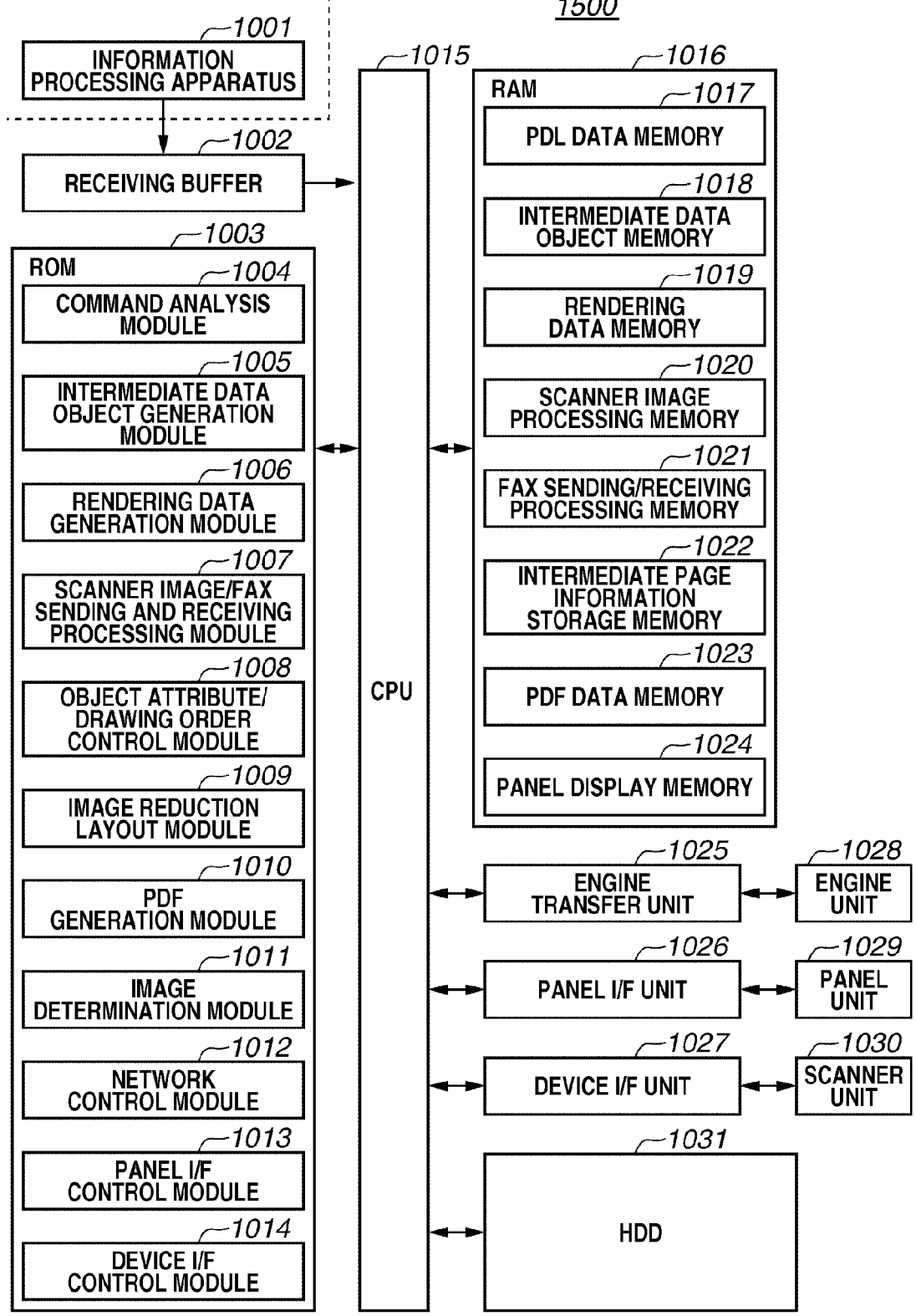
FIG. 1 illustrates an example of a configuration of an image forming system according to an exemplary embodiment of the present invention.

FIG. 7 illustrates an example of a user interface that can be displayed on a display device of an information processing apparatus illustrated in FIG. 1 according to an exemplary embodiment of the present invention.

Figure 8:
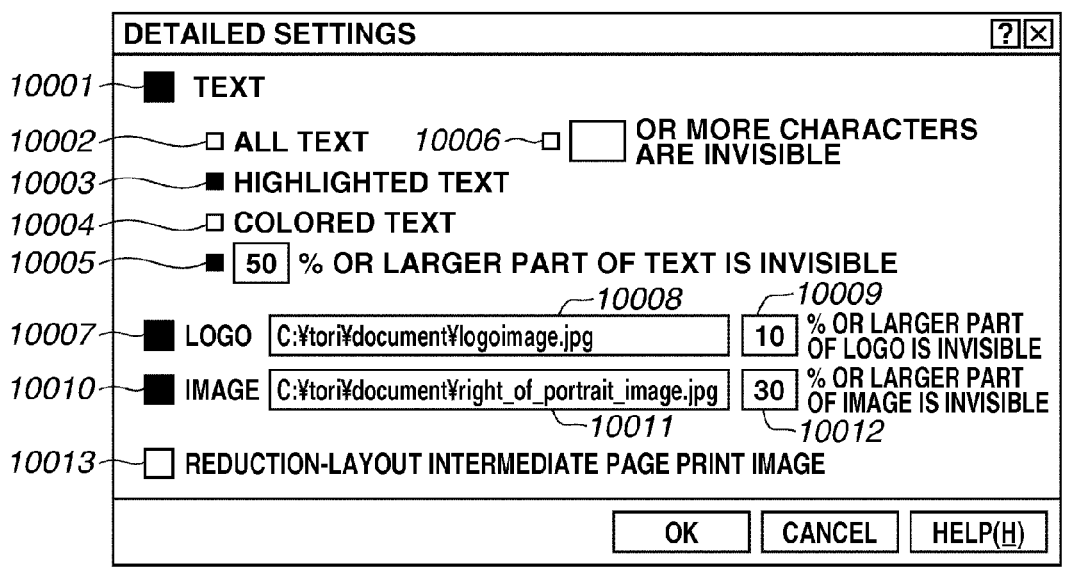

FIG. 8 illustrates an example of a user interface that can be displayed on the display device of the information processing apparatus illustrated in FIG. 1 according to an exemplary embodiment of the present invention.

Figure 9:
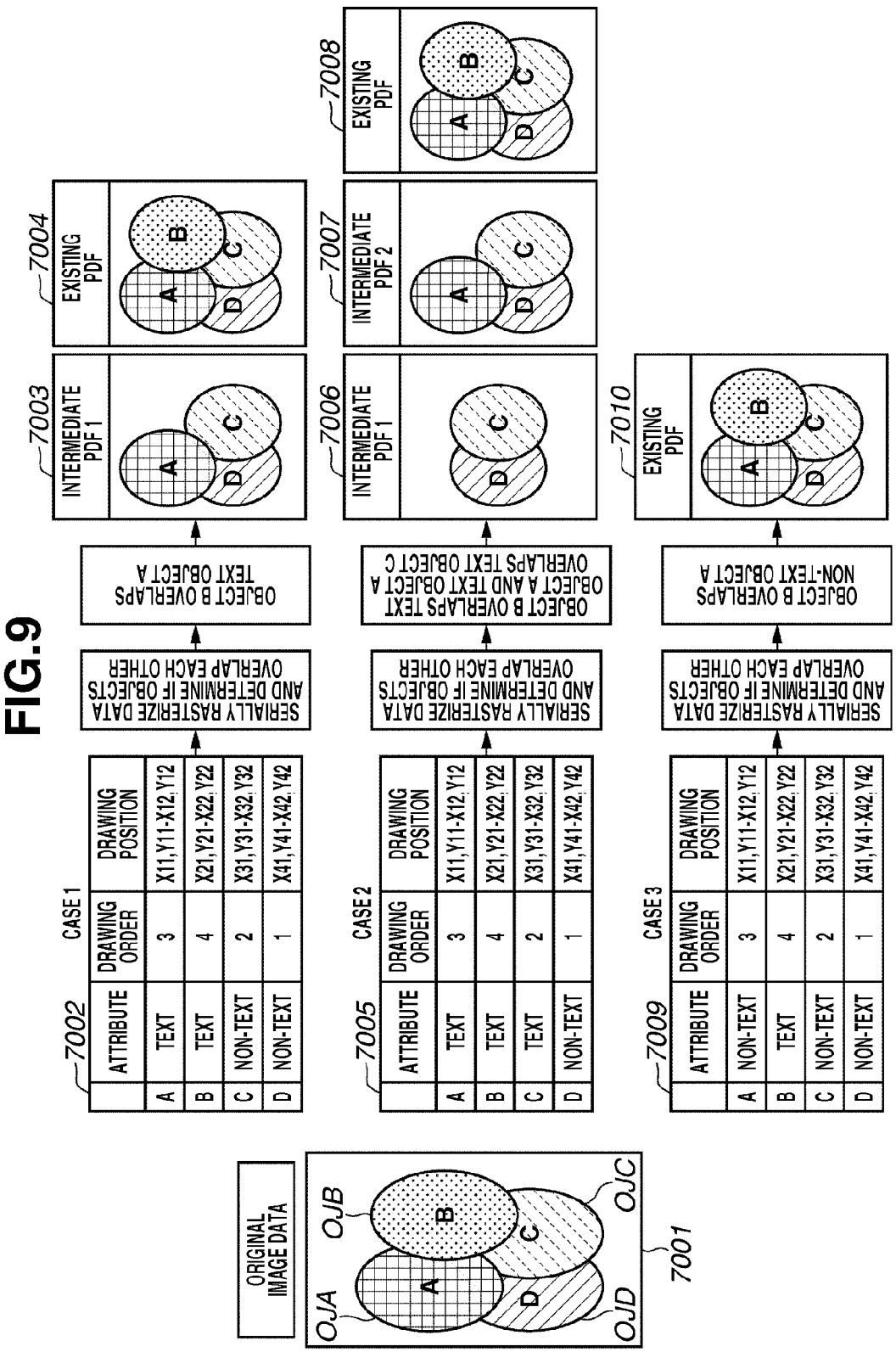

FIG. 9 illustrates an example of a flow of drawing processing on objects performed by the image forming apparatus according to an exemplary embodiment of the present invention.

Figure 10:
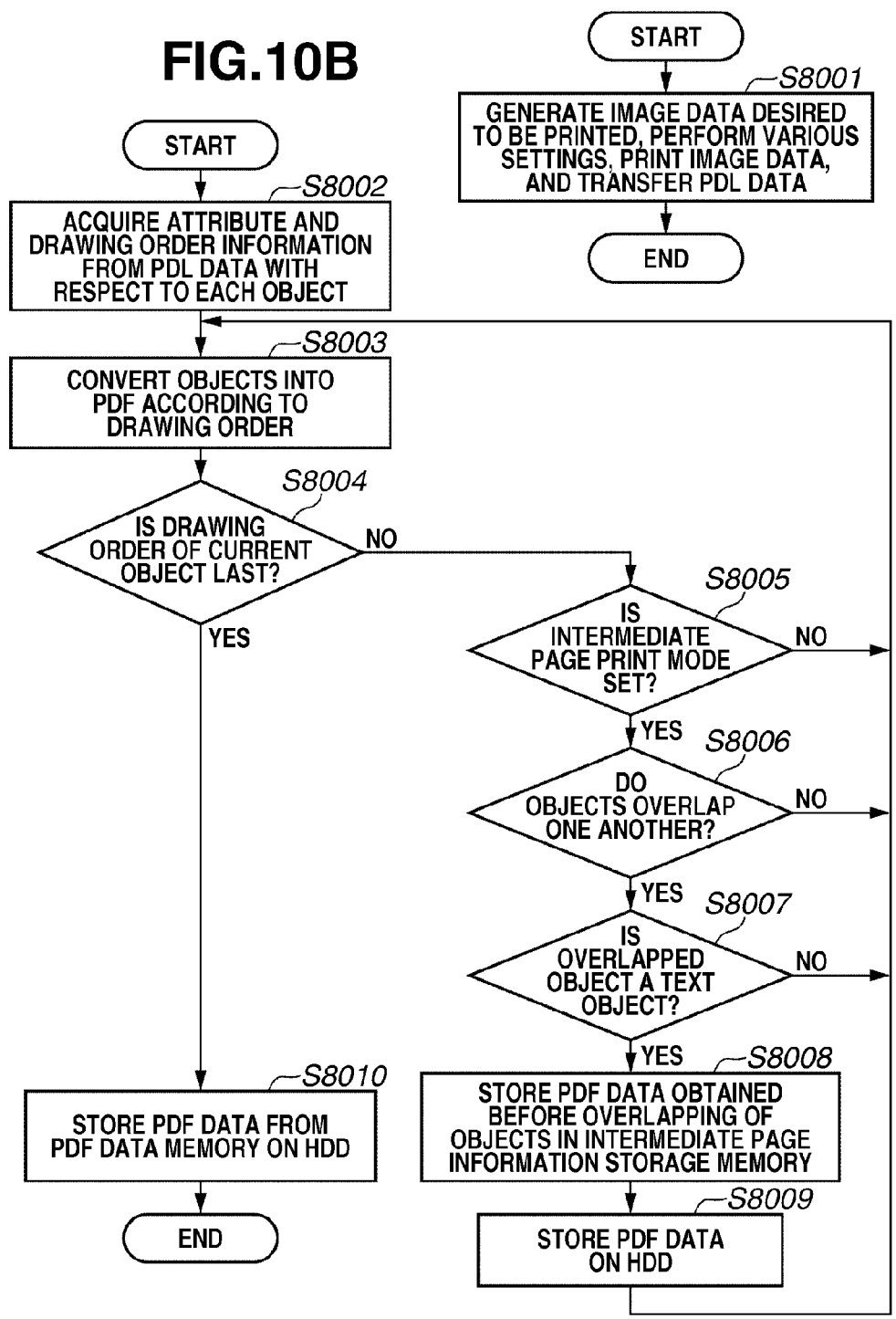

Each of FIGS. 10A and 10B is a flow chart illustrating an example of a flow of data processing performed in the image forming system according to an exemplary embodiment of the present invention.

Figure 11:
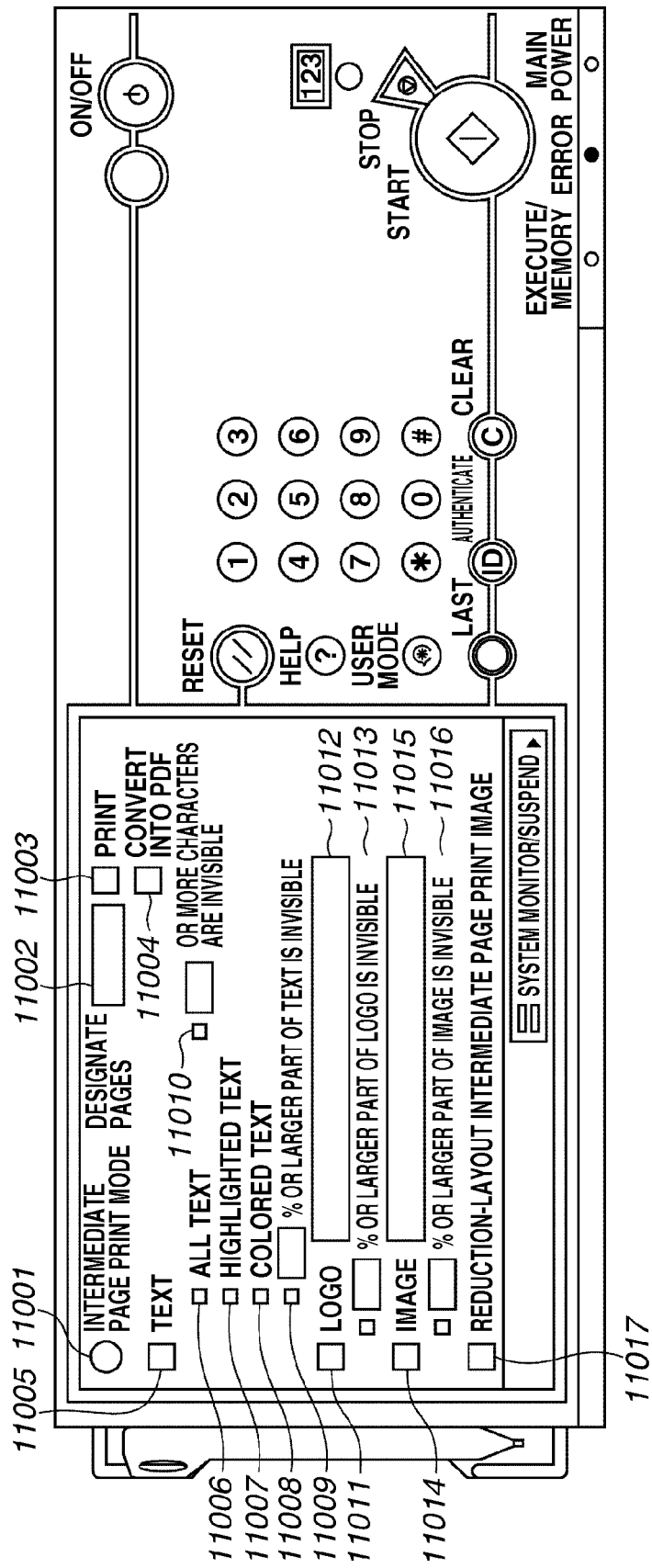

FIG. 11 illustrates an example of a user interface of the image forming apparatus according to an exemplary embodiment of the present invention.

FIG. 12 is a memory map of a storage medium that stores various types of data processing programs that can be read by the image forming apparatus according to an exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

First Exemplary Embodiment

A first exemplary embodiment of the present invention is described below. FIG. 1 illustrates an example of a configuration of an image forming system according to the present exemplary embodiment. Referring to FIG. 1, the image forming system includes an information processing apparatus 1001 and an image forming apparatus 1500. The information processing apparatus 1001 and the image forming apparatus 1500 are in communication with each other via a network. Here, the image forming apparatus 1500 includes a scanner and a printer.

The present exemplary embodiment can output a text object that has been overwritten with an object whose drawing order is later and thus cannot be visualized as intermediate page data according to a drawing order and an attribute with respect to each object.

The information processing apparatus 1001 includes a printer driver installed therein. The printer driver generates page description language (PDL) data according to a print request from an application and transfers the generated PDL data to the image forming apparatus 1500. In this case, the printer driver adds, to the PDL data, information for instructing an intermediate page print mode, which can be designated via a user interface (UI) screen.

In the example illustrated in FIG. 1, the image forming apparatus 1500 includes a controller unit including components 1002 through 1027. Furthermore, the image forming apparatus 1500 includes an engine unit 1028, a panel unit 1029, a scanner unit 1030, and a hard disk drive (HDD) 1031.

The information processing apparatus 1001 sends a print job that has been generated as PDL data to the image forming apparatus 1500 via the printer driver installed on the information processing apparatus 1001. In the image forming system according to the present exemplary embodiment, the information processing apparatus 1001 and the image forming apparatus 1500 are communicably connected with each other via the network, as described above. As the network, Ethernet is generally used.

The print data (PDL data) sent from the information processing apparatus 1001 is temporarily stored in a receiving buffer 1002.

A read-only memory (ROM) 1003 stores a program used in the image forming system. The ROM 1003 stores various types of modules.

The ROM 1003 includes a command analysis module 1004. The command analysis module 1004 analyzes a PDL command in the PDL data stored in the receiving buffer 1002.

An intermediate data object generation module 1005 performs drawing processing. Furthermore, the intermediate data object generation module 1005 generates an intermediate data object based on the PDL data stored on a PDL data memory 1017 provided on a random access memory (RAM) 1016. Moreover, the intermediate data object generation module 1005 stores the thus generated intermediate data object on an intermediate data object memory 1018 provided on the RAM 1016.

A rendering data generation module 1006 performs rendering processing. Furthermore, the rendering data generation module 1006 converts an intermediate data object stored on the intermediate data object memory 1018, which is provided on the RAM 1016 as described above, into rendering data (bitmap data). Moreover, the rendering data generation module 1006 stores rendering data on a rendering data memory 1019 provided on the RAM 1016.

A scanner image/fax sending and receiving processing module 1007 performs processing on a scanner image and data sent and received via facsimile. An object attribute/drawing order control module 1008 controls an attribute of an object and information about the drawing order.

An image reduction layout module 1009 reduces an image. Furthermore, the image reduction layout module 1009 generates a layout of a page so that the page includes a plurality of pages and outputs the page having the generated layout. A PDF generation module 1010 generates a PDF. An image determination module 1011 performs a comparison of images during an "intermediate page print mode". Note that the "intermediate page print mode" will be described in detail later below.

A network control module 1012 controls a network. A panel interface (I/F) control module 1013 controls a panel interface. A device I/F control module 1014 controls an interface with a scanner unit 1030.

The image forming system includes a central processing unit (CPU) 1015, the RAM 1016, and the PDL data memory 1017. The RAM 1016 stores command analysis data analyzed by the command analysis module 1004.

Furthermore, the image forming system includes the intermediate data object memory 1018, as described above. The intermediate data object memory 1018 stores an intermediate data object. The intermediate data object is generated by the intermediate data object generation module 1005 based on the PDL data stored on the PDL data memory 1017.

The rendering data memory 1019 stores rendering data. The rendering data is generated by the rendering data generation module 1006 based on the intermediate object stored on the intermediate data object memory 1018.

A scanner image processing memory 1020 is used during scanner image processing. A FAX sending and receiving processing memory 1021 is used during FAX sending and receiving processing.

An intermediate page information storage memory 1022 is used during an "intermediate page print mode".

A PDF data memory 1023 stores PDF data when a setting "convert overwritten and invisible object into PDF" is set for the "intermediate page print mode". A panel display memory 1024 is used for a panel display.

An engine transfer unit 1025 transfers bitmap information to an engine unit 1028 (to be described in detail below with reference to FIG. 2). A panel I/F unit 1026 transfers panel information to a panel unit 1029.

A device I/F unit 1027 performs a communication with the scanner unit 1030. Furthermore, the image forming system includes the engine unit 1028 (to be described in detail below with reference to FIG. 2), the panel unit 1029, the scanner unit 1030, and an HDD 1031.

A print operation performed the image forming system having the above-described configuration will be described in detail below.

When a user uses an application on the information processing apparatus 1001 and instructs the execution of print processing, control code and data are sent from the information processing apparatus 1001 to the image forming apparatus 1500 via a network cable.

The image forming apparatus 1500 temporarily stores the data received via the network in the receiving buffer 1002.

Furthermore, the image forming apparatus 1500 analyzes the data stored in the receiving buffer 1002 according to a program described in the command analysis module 1004. Then, the PDL data is stored on the PDL data memory 1017.

Then, the image forming apparatus 1500 performs processing on the PDL data according to the program described in the intermediate data object generation module 1005. Subsequently, the image forming apparatus 1500 generates an intermediate data object for each of graphics, text, and image data (image object).

Furthermore, the image forming apparatus 1500 generates an intermediate data object for all the image objects in one page. Then, the image forming apparatus 1500 rasterizes the generated intermediate data object into rendering data (bitmap data) according to a program described in the rendering data generation module 1006.

The bitmap data rasterized according to a program described in the rendering data generation module 1006 is sent to the engine unit 1028 via the engine transfer module 1025. Then, the received data is printed on a transfer material. The transfer material having the printed image is discharged from a specific discharge port.

Figure 2:
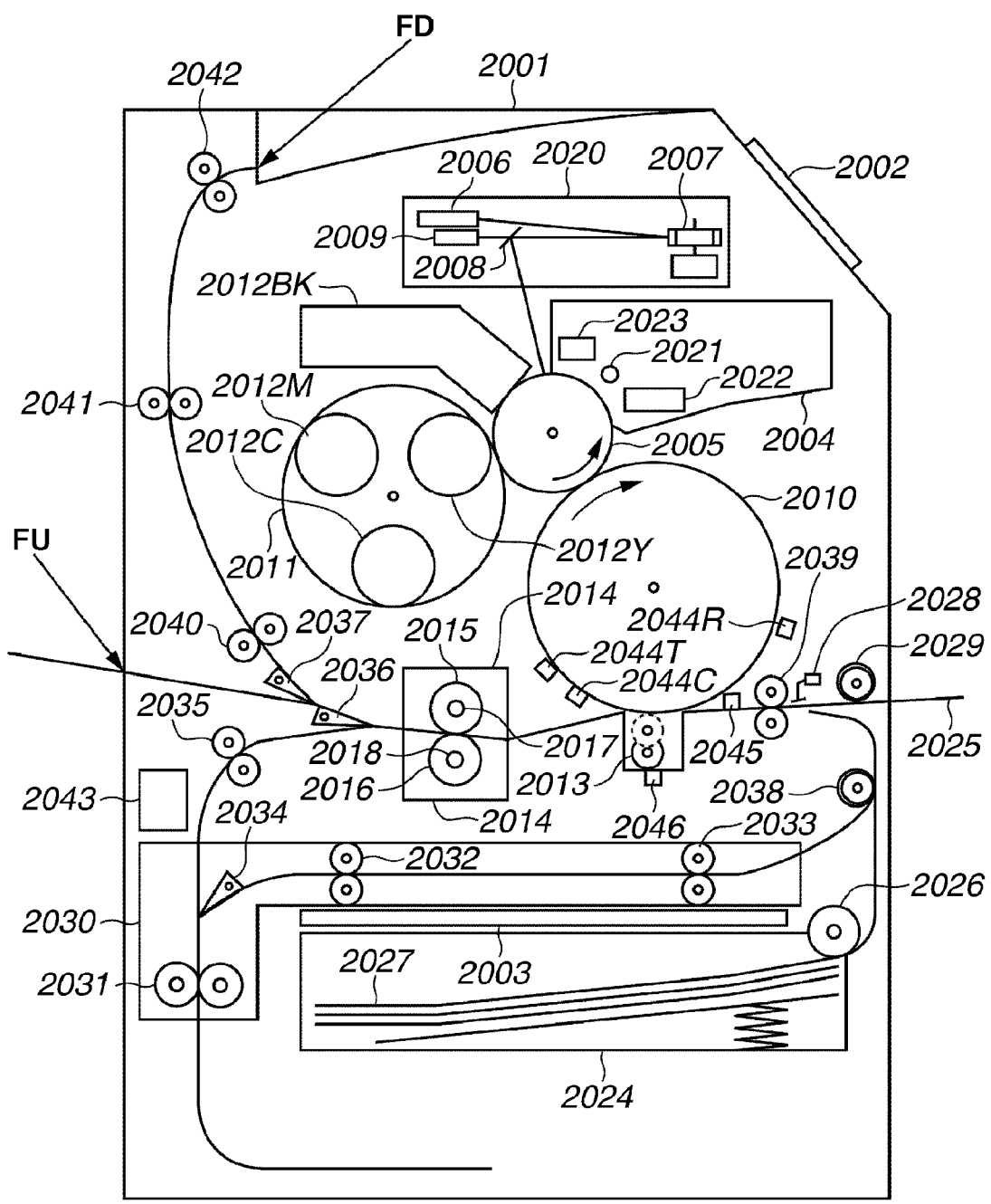
FIG. 2 is a cross section illustrating an example of a structure of an engine unit illustrated in FIG. 1 according to an exemplary embodiment of the present invention.

FIG. 2 is a cross section illustrating an example of a configuration of the engine unit 1028 illustrated in FIG. 1 according to the present exemplary embodiment.

Referring to FIG. 2, the engine unit 1028 includes a housing 2001. The housing 2001 includes therein each mechanism constituting the engine unit 1028. Furthermore, the engine unit 1028 includes an operation panel 2002. Each mechanism constituting the engine unit 1028 includes the following plurality of mechanisms.

That is, the engine unit 1028 includes an optical processing mechanism. The optical processing mechanism forms an electrostatic latent image on a photosensitive drum by scanning with a laser beam. Furthermore, the optical processing mechanism visualizes the electrostatic latent image.

Furthermore, the optical processing mechanism multiple-transfers the visualized image to an intermediate transfer member 2010. Then, the optical processing mechanism further transfers a multiple-transferred color image onto the transfer material 2027.

Furthermore, the engine unit 1028 includes a fixing processing mechanism. The fixing processing mechanism fixes a toner image transferred on the transfer material 2027. In addition, the engine unit 1028 includes a transfer material feeding processing mechanism and a transfer material conveyance processing mechanism.

Furthermore, the optical processing mechanism includes a laser driver 2006. The laser driver 2006 controls the emission of a laser beam emitted from a semiconductor laser unit (not illustrated) in a laser scanner unit 2020 according to image data supplied from a printer controller 2003. The laser beam emitted from the semiconductor laser unit by the drive control of the laser driver 2006 is reflected on a rotating polygonal mirror 2007 in a scanning direction. The laser beam reflected in a main scanning direction is then guided to a photosensitive drum 2005 via a reflecting mirror 2008 to expose the photosensitive drum 2005 in the main scanning direction.

The photosensitive drum 2005 is charged by a primary charging device 2023 provided in a development device 2004. After the photosensitive drum 2005 is scanned and exposed with the laser beam, an electrostatic latent image is formed on the surface of the photosensitive drum 2005. The latent image is visualized into a toner image using a supplied toner. Then, the toner image is applied with an inverse voltage and is transferred (primary transfer) from the photosensitive drum 2005 onto the intermediate transfer member 2010.

In a color image forming mode, a development rotary unit 2011 rotates according to each rotation of the intermediate transfer member 2010. Development processing is performed in the order of a yellow development device 2012Y, a magenta development device 2012M, a cyan development device 2012C, and a black development device 2012BK. The intermediate transfer member 2010 rotates four times to serially form yellow, magenta, cyan, and black visualized images. As a result, a full color visible image is formed.

Furthermore, in a monochromatic image forming mode, development processing is performed using only the black development device. In this case, the intermediate transfer member 2010 rotates once to form a black visible image. Thus, a monochromatic visible image is formed on the intermediate transfer member 2010 (primary transfer).

The toner image formed on the intermediate transfer member 2010 is transferred onto the transfer material 2027, which is fed by the feeding processing mechanism in synchronization in a sub scanning direction (second transfer).

More specifically, the transfer material 2027, which has been stopped at a transfer roller 2013, is conveyed. At the same time as the transfer material 2027 is caused to pressure-contact the intermediate transfer member 2010 by the transfer roller 2013, a bias of inverse characteristic against the toner characteristic is applied to the transfer roller 2013. Thus, the toner image is transferred to the transfer material 2027, which is fed by the feeding processing mechanism in synchronization in the sub scanning direction, and is visualized.

The photosensitive drum 2005, the yellow development device 2012Y, the magenta development device 2012M, the cyan development device 2012C, and the black development device 2012BK can be detached from the engine unit 1028. Here, the development devices other than that for black (namely, the yellow development device 2012Y, the magenta development device 2012M, and the cyan development device 2012C) are provided in the development rotary unit 2011.

The reflecting mirror 2008 is constituted by a semi-transmissive mirror. A beam detector 2009 is disposed on the back side of the semi-transmissive mirror. The Beam detector 2009 detects a laser beam. The detected signal is sent to the printer controller 2003.

Each of controllers 1002 through 1027 generates a horizontal synchronizing signal (BD signal). The BD signal determines a timing of exposure in the main scanning direction according to the signal detected by the beam detector 2009. The horizontal synchronizing signal is output to the CPU 1015 of the controller unit.

A cleaner 2022 removes the residual toner from the photosensitive drum 2005. A pre-exposure lamp 2021 optically destaticizes the photosensitive drum 2005.

The transfer roller 2013 can be moved in a vertical direction in FIG. 2. In addition, the transfer roller 2013 includes a drive unit.

During processing for forming a four-color toner image on the intermediate transfer member 2010, that is, while the intermediate transfer member 2010 rotates several times, the transfer roller 2013 is located in a lower portion of the engine unit 1028 (at a position distant from the intermediate transfer member 2010 not to contact thereon) so as not to affect the image, as illustrated in FIG. 2 with a solid line.

When the processing for forming the four-color toner image on the intermediate transfer member 2010 ends, the transfer roller 2013 is pressed against the intermediate transfer member 2010 at a predetermined level of pressure. More specifically, the transfer roller 2013 is pressed by a cam member (not illustrated) against the intermediate transfer member 2010 at a predetermined level of pressure via the transfer material 2027 at an upper portion of the engine unit 1028 as illustrated in FIG. 2 with a dotted line in synchronization with the timing for transferring the color image on the transfer material 2027.

At the same time, the transfer roller 2013 is applied with a bias. Thus, the toner image is transferred from the intermediate transfer member 2010 onto the transfer material 2027.

A transfer roller cleaner 2046 cleans the transfer roller 2013 by removing the toner adhered thereto on a portion of the surface of the transfer roller 2013 out of a transfer area of the transfer material 2027 from the intermediate transfer member 2010.

Furthermore, an image forming starting position detection sensor 2044T is disposed around the intermediate transfer member 2010. The image forming starting position detection sensor 2044T detects a position for starting print processing in the case of forming an image. Furthermore, a paper feed timing sensor 2044R and a density sensor 2044C are disposed around the intermediate transfer member 2010. The paper feed timing sensor 2044R detects a timing for feeding the transfer material 2027. The density sensor 2044C detects a density of a patch during processing for controlling the density.

During the processing for controlling the density, the density sensor 2044C detects the densitometry of each patch.

Furthermore, the fixing processing mechanism includes a fixing device 2014. The fixing device 2014 applies heat and pressure to the toner image transferred on the transfer material 2027 to fix the toner image.

The fixing device 2014 includes a fixing roller 2015 and a pressure roller 2016. The fixing roller 2015 is used for applying heat to the transfer material 2027. The pressure roller 2016 is used so that the transfer material 2027 press-contacts the fixing roller 2015. Each of the fixing roller 2015 and the pressure roller 2016 is a hollow roller and includes heaters 2017 and 2018. Each roller is rotated to convey the transfer material 2027.

A transfer material detection sensor 2045 automatically detects a type of the transfer material 2027. The printer controller 2003 improves the level of fixation of the toner image on the transfer material 2027 by adjusting the length of the time for causing the transfer material 2027 to pass through the fixing device 2014 according to the characteristic of the transfer material 2027, which is detected by the transfer material detection sensor 2045 and thereby changing the length of time for conveying the transfer material 2027.

The transfer material feeding mechanism includes a cassette 2024 and a manual feed tray 2025. The transfer material 2027 is stacked on the cassette 2024 and the manual tray 2025. The transfer material feeding mechanism selectively feeds the transfer material 2027 from either the cassette 2024 or the manual feed tray 2025.

The cassette 2024 is mounted on the housing 2001. The cassette 2024 includes a paper size detection mechanism. The paper size detection mechanism electrically detects a size of the transfer material 2027 according to a position to which a partitioning plate (not illustrated) has moved.

The transfer material 2027 is conveyed from the cassette 2024 to a paper feed roller 2038 sheet by sheet from a top of the stack of the transfer materials 2027 on the cassette 2024 by the rotational drive of a cassette paper feed clutch 2026.

The cassette paper feed clutch 2026 is constituted by a cam that is intermittently and rotationally driven by a drive unit (not illustrated) for each feeding of paper. One sheet of the transfer material 2027 is fed as the cam rotates once.

The paper feed roller 2038 conveys the transfer material 2027 to a position at which a leading edge of the transfer material 2027 reaches a registration shutter 2028. When the transfer material 2027 to be fed is applied with pressure, the registration shutter 2028 stops the feeding of the transfer material 2027.

Furthermore, when the application of pressure to the transfer material 2027 to be fed is suspended, the registration shutter 2028 discontinues the suspension of feeding the transfer material 2027. The printer controller 2003 performs control so that the operation of the registration shutter 2028 is in synchronization with the scanning with the laser beam in the sub scanning direction.

The manual feed tray 2025 is provided within the housing 2001. The transfer material 2027 is placed on the manual feed tray 2025 by a user. The transfer materials 2027 stacked on the manual feed tray 2025 are fed by a paper feed roller 2029 towards the registration shutter 2028.

The transfer material conveyance processing mechanism includes a conveyance roller 2039. The conveyance roller 2039 conveys the transfer material 2027 towards the intermediate transfer member 2010 when the application of pressure by the registration shutter 2028 thereon is stopped. Furthermore, the transfer material conveyance processing mechanism includes flappers 2036 and 2037. The flappers 2036 and 2037 are used to guide the transfer material 2027 that has exited the fixing device 2014 to a paper discharge tray FD, which is provided in an upper surface portion of the housing 2001. In addition, the transfer material conveyance processing mechanism includes conveyance rollers 2040, 2041, and 2042. Moreover, the transfer material conveyance processing mechanism includes a drive unit (not illustrated) that drives each of the conveyance rollers 2040, 2041, and 2042.

A destination of discharge of the paper discharge tray FD, which is provided on the upper surface portion of the housing 2001, and a paper discharge tray FU, which is provided on the side of the housing 2001, can be changed by changing the orientation of the flapper 2037.

Furthermore, two-sided printing can be performed by changing the orientation of the flapper 2036. A reverse paper feed unit 2030 includes engine conveyance rollers 2031, 2032, 2033, and 2035, and a flapper 2034.

In addition, a panel unit 2002 (or the panel unit 1029 in FIG. 1) is mounted on the housing 2001. An external memory unit 2043 is used to store print data.

Figure 3:
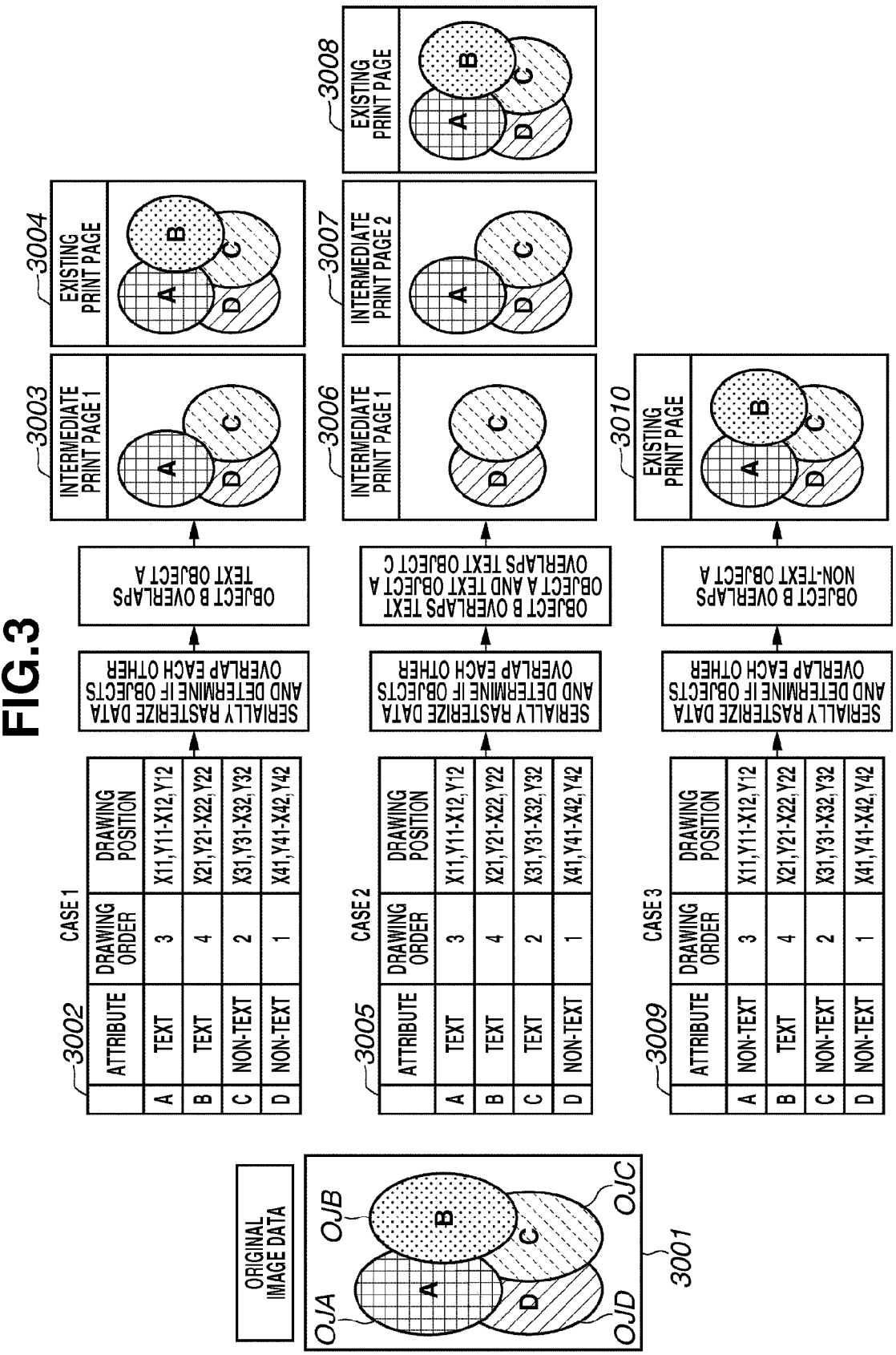
FIG. 3 illustrates an example of a flow of drawing processing on objects performed by the image forming apparatus according to an exemplary embodiment of the present invention.

FIG. 3 illustrates an example of drawing processing performed by the image forming apparatus 1500 on an object according to the present exemplary embodiment.

Referring to FIG. 3, original image data 3001 includes four objects (objects OJA through OJD) overlapping one another. Hereinbelow, Case 1, Case 2, and Case 3 are described with reference to FIG. 3.

In Case 1, an attribute of the object OJA is text as illustrated in a table 3002. A drawing order of the object OJA is the third.

An attribute of the object OJB is text, and its drawing order is the fourth. With respect to the drawing order, the drawing order becomes later as the value thereof becomes greater. Thus, the object having the third drawing order is drawn prior to the object having the fourth drawing order.

An attribute of the object OJC is graphics or image different from text. The drawing order thereof is the second. An attribute of the object OJD is graphics or image different from text. The drawing order thereof is the first.

That is, in Case 1, the text object OJA cannot be visualized because it is overwritten with the object OJB.

In Case 2, an attribute of the object OJA is text as illustrated in a table 3005. The drawing order thereof is the third. An attribute of the object OJB is text. The drawing order thereof is the fourth. An attribute of the object OJC is text. The drawing order thereof is the second. An attribute of the object OJD is graphics or image different from text. The drawing order thereof is the first.

That is, in Case 2, apart of the text object OJC cannot be visualized because it is overwritten with the object OJA and the object OJB. Furthermore, a part of the text object OJA cannot be visualized because it is overwritten with the object OJB.

In Case 3, an attribute of the object OJA is graphics or image different from text as illustrated in a table 3009. The drawing order thereof is the third. In addition, in Case 3, an attribute of the object OJB is text. The drawing order thereof is the fourth. An attribute of the object OJC is graphics or image different from text. The drawing order thereof is the second.

Furthermore, an attribute of the object OJD is graphics or image different from text. The drawing order thereof is the first. That is, in Case 3, the text object OJB can be visualized because it is not overwritten with any other objects.

Each of FIGS. 4A and 4B is a flow chart illustrating an example of data processing performed in the image forming system according to the present exemplary embodiment. The examples in FIGS. 4A and 4B illustrate drawing processing performed by the image forming apparatus 1500.

The processing illustrated in FIG. 4A is performed by the information processing apparatus 1001. The processing of step S4001 in FIG. 4A is executed by a printer driver installed in the information processing apparatus 1001.

Furthermore, the processing illustrated in FIG. 4B is performed by the image forming apparatus 1500. Processing in steps S4002 through S4010 can be performed by the CPU 1015 of the image forming apparatus 1500 by loading and executing a control program from the ROM 1003 on the RAM 1016.

Here, whether it is necessary to record a page as an intermediate page can be determined by a conventional method based on an attribute and a drawing order included in the PDL of each object. Accordingly, the present exemplary embodiment performs processing on objects in the following manner.

At the start of the processing, the user executes an application installed in the information processing apparatus 1001 to generate original image data 3001 desired to be printed. In step S4001, the user uses a printer driver previously installed in the information processing apparatus 1001 to perform various settings on print data. Then, the user presses a print key displayed on a UI, which is provided by the printer driver. Thus, the printer driver transfers the generated PDL data to the image forming apparatus 1500 via the network.

When the CPU 1015 of the image forming apparatus 1500 stores print data (including control code and data) in the receiving buffer 1002, the command analysis module 1004 stores the print data on the PDL data memory 1017. The intermediate data object generation module 1005 generates an intermediate data object based on the PDL data stored on the PDL data memory 1017.

In step S4002, the rendering data generation module 1006 acquires information about the attribute (text or graphics or image different from text) and the drawing order with respect to each object stored on the intermediate data object memory 1018.

For example, in Case 1 illustrated in FIG. 3, the table 3002 illustrates information about the attribute and the drawing order with respect to each object. In Case 2, table 3005 illustrates information about the attribute and the drawing order with respect to each object. In Case 3, table 3009 illustrates information about the attribute and the drawing order with respect to each object.

In step S4003, the rendering data generation module 1006 uses a work memory in the RAM 1016 to perform rendering processing on the objects according to the drawing order.

In step S4004, the rendering data generation module 1006 determines whether the drawing order of the object rendered by the rendering data generation module 1006 is the last.

Here, the determination as to whether the drawing order of the object rendered by the rendering data generation module 1006 is the last can be performed according to whether a printing and rendering command has been received.

If it is determined in step S4004 that the drawing order of the object rendered by the rendering data generation module 1006 is not the last (NO in step S4004), then the rendering data generation module 1006 advances to step S4005. In step S4005, the rendering data generation module 1006 determines whether the "intermediate page print mode" has been set.

Here, in the "intermediate page print mode", information about an intermediate state of a page immediately before being overwritten with another object in a case where an object, such as a text object, is overwritten with another object overlapping thereon and thus the overwritten object cannot be visualized.

The "intermediate page print mode" can be set via the driver setting screen of the information processing apparatus 1001 and via the UI screen of the image forming apparatus 1500. The driver setting screen of the information processing apparatus 1001 and the UI screen of the image forming apparatus 1500 will be described in detail below.

Furthermore, the "intermediate page print mode" can be designated with respect to each page via the driver setting screen of the information processing apparatus 1001 and the UI screen of the image forming apparatus 1500. With respect to the page to which the "intermediate page print mode" is not designated, processing described with respect to general image forming processing is performed. That is, in this case, the page to which the "intermediate page print mode" is not designated can be processed at a processing speed higher than that in the case of the page to which the "intermediate page print mode" is designated.

If it is determined in step S4005 that the "intermediate page print mode" has not been set (NO in step S4005), then the rendering data generation module 1006 returns to step S4003. In step S4003, the above-described processing is repeated.

On the other hand, if it is determined in step S4005 that the "intermediate page print mode" has been set (YES in step S4005), then the rendering data generation module 1006 advances to step S4006. In step S4006, the rendering data generation module 1006 determines whether objects overlap one another. That is, the rendering data generation module 1006 determines whether the object having an earlier drawing order overlaps the object having a later drawing order.

The determination as to whether the objects overlap one another can be easily performed by determining drawing positions of the objects.

If it is determined in step S4006 that the objects do not overlap one another (NO in step S4006), then the rendering data generation module 1006 returns to step S4003. In step S4003, the above-described processing is repeated.

On the other hand, if it is determined in step S4006 that objects overlap one another (YES in step S4006), then the rendering data generation module 1006 advances to step S4007. In step S4007, the rendering data generation module 1006 determines whether the attribute of the overlapped object is a specific attribute, such as text.

If it is determined in step S4007 that the attribute of the overlapped object is text (YES in step S4007), then the processing advances to step S4008. In step S4008, the rendering data generation module 1006 stores rendering data obtained before the rendering data generation module 1006 overlaps objects in the intermediate page information storage memory 1022.

In step S4009, the rendering data generation module 1006 transfers the rendering data stored in the intermediate page information storage memory 1022 to the engine unit 1028. Furthermore, the rendering data generation module 1006 performs print processing on the data. Then, the processing returns to step S4003.

On the other hand, if it is determined in step S4004 that the drawing order of the rendered object is the last (YES in step S4004), then the rendering data generation module 1006 advances to step S4010. In step S4010, the rendering data generation module 1006 transfers the rendering data stored in rendering data memory 1019 to the engine unit 1028. Furthermore, the rendering data generation module 1006 performs print processing on the data. Then, the processing ends.

According to the above-described processing, in Case 1, the rendering processing is performed in order of the object OJD, the object OJC, and the object OJA. The objects are temporarily stored on the intermediate page information storage memory 1022 in a state 3003, in which the page including the objects are rendered as an intermediate page, and then are printed with the engine unit 1028.

Then, the last object OJB is rendered for overwriting. Then, existing page information 3004 is printed with the engine unit 1028 as normal last page information. In this manner, an image including the object OJD, the object OJC, and the object OJA, which does not include the object OJB, and an image including the object OJD, the object OJC, the object OJA, and the object OJB are printed separately from each other.

Furthermore, in Case 2, the rendering processing is performed in order of the object OJD and the object OJC in the above-described manner. The data is temporarily stored in the intermediate page information storage memory 1022 in a state 3006 in which the data has been rendered as an intermediate page. Then, the data is printed by the engine unit 1028. Then, the data is temporarily stored in the intermediate page information storage memory 1022 in a state 3007 in which the object OJA is rendered. Then, the data is printed by the engine unit 1028. Then, the last object OJB is rendered for overwriting. Subsequently, the existing page information 3008 is printed by the engine unit 1028 as normal last page information.

Furthermore, in Case 3, the rendering processing is performed in order of the object OJD, the object OJC, and the object OJA in the above-described manner. After having rendered the last object OJB, existing page information 3010 is printed with the engine unit 1028 as normal last page information.

In the above-described exemplary embodiment, the rendering processing is performed within the image forming apparatus 1500. However, the same effect as that described above can be achieved by performing the rendering processing with the printer driver of the information processing apparatus 1001. In this case, the printer driver analyzes print data, determines whether objects overlap one another, and generates data to be printed, thus achieving the same effect as that described above.

Furthermore, in the present exemplary embodiment, the text object can be used in either of a case where a character code is used or a case where an object having a text attribute is used to achieve the same effect as that described above.

According to the present exemplary embodiment having the above-described configuration, information (object), which cannot be visualized in a conventional animation display because it is overwritten with another object even though the user desires to visualize the same, can be printed as intermediate page information using and according to information about the attribute and the drawing order included in the PDL with respect to each object.

Second Exemplary Embodiment

A second exemplary embodiment of the present invention is described below. In the second exemplary embodiment, detailed information about a text object that cannot be acquired in the first exemplary embodiment can be set. Furthermore, in the second exemplary embodiment, even if either a logo, an image including the face of a person, or an image with a right of likeness is overwritten with another object and thus cannot be visualized, the intermediate page data can be output. Here, an image including the face of a person, or the image with the right of likeness includes data to which a copyright may be set.

The configuration of the image forming system according to the present exemplary embodiment is similar to that in the first exemplary embodiment.

The print operation performed in the image forming system having the above-described configuration is described.

When the user operates the information processing apparatus 1001 to issue an instruction for starting a print operation, the information processing apparatus 1001 sends control code and data to the image forming apparatus 1500 via the network cable.

The image forming apparatus 1500 temporarily stores the control code and data sent from the information processing apparatus 1001 in the receiving buffer 1002. The CPU 1015 executes a program described in the command analysis module 1004 and stores, on the PDL data memory 1017, PDL data generated as a result of analyzing the control code and data stored in the receiving buffer 1002.

Then, the CPU 1015 executes a program described in the intermediate data object generation module 1005, processes the data, and generates an intermediate data object with respect to each of graphics, text, and image data (image object).

The intermediate data object generation module 1005 generates an intermediate data object with respect to all image objects included in one page. Then, the CPU 1015 executes a program described in the rendering data generation module 1006 to rasterize the rendering data (bitmap data) on the rendering data memory 1019.

The bitmap data rasterized by the rendering data generation module 1006 in this way is then sent to the engine unit 1028 via the engine transfer module 1025. Then, the data is printed by the engine unit 1028 on the transfer material 2027. Then, the transfer material 2027 having the printed image is fed from a predetermined paper feed port and is then discharged from a predetermined discharge port.

FIG. 5 illustrates an example of drawing processing performed by the image forming apparatus 1500 on an object according to the present exemplary embodiment.

Referring to FIG. 5, example original image data 5001 includes four objects overlapping one another. The present exemplary embodiment is described below with respect to the following cases "Case 1, Case 2, and Case 3".

In Case 1, as illustrated in a table 5002, the attribute of the object OJA is text. The decoration information thereof is "highlight". The drawing order thereof is the third. An attribute of the object OJB is text. The drawing order thereof is the fourth. An attribute of the object OJC is graphics or image different from text. The drawing order thereof is the second.

An attribute of the object OJD is graphics or image different from text. The drawing order thereof is the first. That is, in Case 1, the text object A, which is desired by the user to be highlighted, cannot be visualized because it is overwritten with the object OJB.

In Case 2, as illustrated in a table 5005, an attribute of the object OJA is image. The drawing order thereof is the third. An attribute of the object OJB is text. The drawing order thereof is the fourth.

An attribute of the object OJC is image. The drawing order thereof is the second. An attribute of the object OJD is graphics. The drawing order thereof is the first.

That is, in Case 2, a part of the image object C cannot be visualized because it is overwritten with the object OJA and the object OJB. Furthermore, in Case 2, a part of the image object OJA cannot be visualized because it is overwritten with the object B. Here, the ratio of the part of the image object OJC that cannot be visualized is 40%. The ratio of the part of the object OJA that cannot be visualized is 20%.

Furthermore, the image object OJC is designated with an absolute path of the image on the driver setting screen (FIG. 7 and FIG. 8), which will be described in detail below. Furthermore, the image object OJA is designated with an absolute path of a "logo" on the driver setting screen (FIG. 7 and FIG. 8), which will be described in detail below.

In Case 3, as illustrated in a table 5009, an attribute of the object OJA is text. The drawing order thereof is the third. An attribute of the object OJB is text. The drawing order thereof is the fourth. An attribute of the object C is graphics or image different from text. The drawing order thereof is the second. An attribute of the object OJD is graphics or image different from text". The drawing order thereof is the first.

That is, in Case 3, apart of the text object OJA cannot be visualized because it is overwritten with the object OJB. Here, the ratio of the part of the text object OJA that cannot be visualized is 30%.

Each of FIGS. 6A and 6B is a flow chart illustrating an example of data processing performed in the image forming system according to the present exemplary embodiment. More specifically, FIGS. 6A and 6B each illustrate an example of drawing processing performed by the image forming apparatus 1500.

The processing illustrated in FIG. 6A is performed by the information processing apparatus 1001. The processing of step S6001 in FIG. 6A can be executed by the printer driver installed in the information processing apparatus 1001.

The processing illustrated in FIG. 6B can be performed by the image forming apparatus 1500. Processing in steps S6002 through step S6018 can be performed with the CPU 1015 of the image forming apparatus 1500 by loading and executing a control program from the ROM 1003 on the RAM 1016.

Referring to FIG. 6A, at the start of the processing, the user operates the information processing apparatus 1001 to execute the application and generate print data 5001 desired to be printed.

Then, in step S6001, the user uses the printer driver installed in the information processing apparatus 1001 to perform various settings with respect to the print data. Then, the user presses a print key displayed on the UI, which is provided by the printer driver. Thus, the printer driver generates PDL data to be sent to the image forming apparatus 1500. Then, the printer driver transfers the generated PDL data to the image forming apparatus 1500.

In step S6002 (FIG. 6B), the command analysis module 1004 of the image forming apparatus 1500 acquires information about the attribute (text, image, or graphics) and the drawing order with respect to each object based on the PDL data received from the information processing apparatus 1001. Furthermore, in the case where the attribute of the object is text, the command analysis module 1004 of the image forming apparatus 1500 further acquires object decoration information.

Here, the information about the attribute and the drawing order with respect to each object corresponds to the attribute and the drawing order described in the table 5002 of Case 1 illustrated in FIG. 5. In Case 2, the information about the attribute and the drawing order with respect to each object corresponds to the attribute and the drawing order described in the table 5005. In Case 3, the information about the attribute and the drawing order with respect to each object corresponds to the attribute and the drawing order described in the table 5009.

In step S6003, the rendering data generation module 1006 performs rendering processing on the objects according to the drawing order and rasterizes the rendering data on the memory 1019.

In step S6004, the rendering data generation module 1006 determines whether the drawing order of the rendered object is the last. The determination as to whether the drawing order of the rendered object is the last can be performed according to whether a printing and rendering command has been received.

If it is determined in step S6004 that the drawing order of the rendered object is not the last (NO in step S6004), then the rendering data generation module 1006 advances to step S6005. In step S6005, the rendering data generation module 1006 determines whether the "intermediate page print mode" has been set.

Here, in the "intermediate page print mode", information about an intermediate state of a page immediately before being overwritten with another object in a case where an object, such as logo information or an image to which a right of likeness has been set, is overwritten with another object overlapping thereon and thus the overwritten object cannot be visualized. The "intermediate page print mode" can be set via the driver setting screen of the information processing apparatus 1001 and via the UI screen of the image forming apparatus 1500. The driver setting screen and the UI screen of the image forming apparatus 1500 will be described in detail below.

Furthermore, the "intermediate page print mode" can be designated with respect to each page via the driver setting screen and the UI screen of the image forming apparatus

1500. With respect to the page to which the "intermediate page print mode" is not designated, processing described with respect to general image forming processing is performed. That is, in this case, the page to which the "intermediate page print mode" is not designated can be processed at a processing speed higher than that in the case of the page to which the "intermediate page print mode" is designated.

If it is determined in step S6005 that the "intermediate page print mode" has not been set (NO in step S6005), then the rendering data generation module 1006 returns to step S6003. In step S6003, the above-described processing is repeated.

On the other hand, if it is determined in step S6005 that the "intermediate page print mode" has been set (YES in step S6005), then the rendering data generation module 1006 advances to step S6006. In step S6006, the rendering data generation module 1006 determines whether objects overlap one another. The determination as to whether the objects overlap one another can be easily performed by determining drawing positions of the objects.

If it is determined in step S6006 that the objects do not overlap one another (NO in step S6006), then the rendering data generation module 1006 returns to step S6003. In step S6003, the above-described processing is repeated. On the other hand, if it is determined in step S6006 that objects overlap one another (YES in step S6006), then the rendering data generation module 1006 advances to step S6007. In step S6007, the rendering data generation module 1006 determines whether the designation for the "intermediate page print mode" is a text and the overlapped object is a text object.

If it is determined in step S6007 that the designation for the "intermediate page print mode" is text and the overlapped object is a text object (YES in step S6007), then the rendering data generation module 1006 advances to step S6008. In step S6008, the rendering data generation module 1006 acquires detailed information about the overlapped text object (decoration information about the text object) and the overlapping ratio (degree).

In step S6009, the rendering data generation module 1006 determines whether the detailed information matches the detailed setting set by the user.

The detailed setting can be set via the "intermediate page print mode" button on the driver setting screen or the UI screen of the image forming apparatus 1500, which will be described in detail below. More specifically, the following five different settings can be set by the user. That is, the user can set either one of "all text", "highlighted text", "colored text", "xx % ("xx" is an integer from 0 to 100) or larger part of texts is invisible", and "xx ("xx" is an integer from 0 to 100) or more characters are invisible".

If it is determined in step S6009 that the detailed information does not match the detailed setting set by the user (NO in step S6009), then the rendering data generation module 1006 advances to step S6010. In step S6010, the rendering data generation module 1006 determines whether the designation for the "intermediate page print mode" is a log and the overlapped object is an image object.

If it is determined in step S6010 that the designation for the "intermediate page print mode" is a log and the overlapped object is an image object (YES in step S6010), then the rendering data generation module 1006 advances to step S6011. In step S6011, the rendering data generation module 1006 acquires detailed information about the overlapped image object (content of the image object) and the overlapping ratio (degree).

In step S6012, the rendering data generation module 1006 determines whether the detailed information matches the detailed setting set by the user. The detailed setting can be set via a "intermediate page print mode" button on the driver setting screen or the UI screen of the image forming apparatus 1500, which will be described in detail below. That is, a logo image file can be set with an absolute path. Furthermore, the user can set an overlapping ratio, such as "xx % or larger part is invisible" ("xx" is an integer from 0 to 100).

If it is determined in step S6012 that the detailed information does not match the detailed setting set by the user (NO in step S6012), then the rendering data generation module 1006 advances to step S6013. In step S6013, the rendering data generation module 1006 determines whether the designation for the "intermediate page print mode" is image and the overlapped object is an image object.

If it is determined in step S6013 that the designation for the "intermediate page print mode" is image and the overlapped object is an image object (YES in step S6013), then the rendering data generation module 1006 advances to step S6014. In step S6014, the rendering data generation module 1006 acquires detailed information about the overlapped image object (content of the image object) and the overlapping ratio (degree).

In step S6015, the rendering data generation module 1006 determines whether the detailed information matches the detailed setting set by the user. The detailed setting can be set via a "intermediate page print mode" button on the driver setting screen or the UI screen of the image forming apparatus 1500, which will be described in detail below. That is, an image file can be set with an absolute path. Furthermore, the user can set an overlapping ratio, such as "xx % or larger part is invisible" ("xx" is an integer from 0 to 100).

On the other hand, if it is determined in step S6009, S6012, or S6015 that the detailed information matches the detailed setting (YES in step S6009, S6012, or S6015), then the rendering data generation module 1006 advances to step S6016.

In step S6016, the rendering data generation module 1006 stores the rendering data obtained before the rendering data generation module 1006 overlaps objects in the intermediate page information storage memory 1022.

The determination as to whether the detailed information matches the detailed setting by the user in steps S6012, S6012, and S6015 can be generally performed using a publicly known method, such as an image detection or an image recognition.

In step S6017, the CPU 1015 transfers the rendering data stored on the intermediate page information storage memory 1022 to the engine unit 1028. Then, the processing returns to step S6003.

On the other hand, if it is determined in step S6004 that the drawing order of the rendered object is the last (YES in step S6004), then the rendering data generation module 1006 advances to step S6018.

In step S6018, the rendering data generation module 1006 transfers the rendering data stored in the rendering data memory 1019 to the engine unit 1028. Then, the processing ends.

Hereinbelow, processing for setting the intermediate page print mode performed via the UI illustrated in FIG. 7 and FIG. 8 is described.

FIG. 7 and FIG. 8 each illustrate an example of the UI screen that can be displayed on the display device of the information processing apparatus 1001 (FIG. 1) according to the present exemplary embodiment. In the example illustrated in FIG. 7 and FIG. 8, an example of the setting screen displayed by the printer driver installed in the information processing apparatus 1001 is illustrated.

FIG. 7 illustrates an example of a setting screen of the printer driver displayed in a print quality sheet of setting screens provided by the printer driver.

Referring to FIG. 7, the setting screen of the driver includes an "intermediate page print mode" setting field 9001. The user performs a page designation 9002 in a state where the "intermediate page print mode" is set. Then, the user presses a "detailed settings" key 9003 to change the screen to the detailed setting screen (FIG. 8). Furthermore, in the present exemplary embodiment, the user can designate whether the printer driver performs the printing in the "intermediate page print mode" with respect to and differently for each page.

In the present exemplary embodiment, the "intermediate page print mode" includes two modes, namely, a mode 9004 for printing an object that has been overwritten with another object and is thus invisible and a mode 9005 for converting the overwritten and invisible object into a PDF.

The user can select either of the following settings as the attribute of the object via the detailed setting screen illustrated in FIG. 8.

That is, in the present exemplary embodiment, the user can select either text 10001, logo 10007, or image 10010 as the attribute of the object.

In the case where the user selects text 10001 as the attribute of the object via the screen illustrated in FIG. 8, the user can further select "all text" 10002, "highlighted text" 10003, "colored text" 10004, "text invisibility ratio" 10005, or "number of invisible characters" 10006.

Furthermore, if the user has selected logo 10007, a logo data storage location can be designated with an absolute path 10008. Furthermore, a logo invisibility ratio 10009 can be selected.

Furthermore, if the user has selected image 10013, then an image storage location can be designated with an absolute path 10011. Moreover, an image invisibility ratio 10012 can be selected.

Furthermore, the user can select a mode 10013 for providing a reduction layout to an intermediate page print image, which will be described in detail below.

The screen illustrated in FIG. 8 is displayed if the user has selected, via the screen illustrated in FIG. 7, "print overwritten and invisible object" via the "intermediate page print mode" setting field 9001 and then pressed the detailed setting button 9003.

In the example of the screen illustrated in FIG. 8, the user has currently set "highlighted text" and "50% or larger part of text is invisible" with respect to "text". Furthermore, the user has currently set a logo image designated with an absolute path and "10% or larger part of logo is invisible" with respect to "logo". In addition, the user has currently set an image designated with an absolute path and "30% or larger part of image is invisible" with respect to "image".

In Case 1 illustrated in FIG. 5, the rendering processing is performed in order of the object OJD, the object OJC, and the object OJA by performing the above-described setting processing. Furthermore, the data is temporarily stored in the intermediate page information storage memory 1022 in a state 5003 in which the data is rendered as an intermediate page. Then, the rendered data is printed by the engine unit 1028.

After rendering the last object OJB for overwriting, existing page information 5004 is printed by the engine unit 1028 as normal last page information.

On the other hand, in Case 2, the rendering processing is performed in order of the object OJD and the object OJC by performing the above-described processing. Then, the data is temporarily stored in the intermediate page information storage memory 1022 in a state 5006 where the data is rendered as the intermediate page. Then, the rendered data is printed by the engine unit 1028.

Then, the object OJA is temporarily stored in the intermediate page information storage memory 1022 in a state 5007 in which the data is rendered. Then, the data is printed by the engine unit 1028. Then, after rendering the last object OJB for overwriting, existing page information 5008 is printed by the engine unit 1028 as normal last page information.

Furthermore, in Case 3, the rendering processing is performed in order of the object OJD, the object OJC, and the object OJA by performing the above-described processing. Then, the object OJB is rendered. Then, the engine unit 1028 prints existing page information 5010 as normal last page information.

In the present exemplary embodiment, the image forming apparatus 1500 performs the rendering processing. However, a similar effect can be achieved by performing the rendering processing by the printer driver of the information processing apparatus 1001.

Furthermore, in the present exemplary embodiment, the "intermediate page print mode" is applied only if the text is a "highlighted text", if "50% or larger part of text is invisible", if "50% or larger part of logo is invisible", or if "50% or larger part of image is invisible". However, the "intermediate page print mode" can be applied in the case where the user has designated "all text", "colored text", "xx or more characters are invisible" ("xx" is an integer from 0 to 100), "xx % or larger part of logo is invisible", or "xx % or larger part of image is invisible". In this case also, a similar effect can be achieved.

Furthermore, in the present exemplary embodiment, the text object can be used in either of a case where text code is used or a case where an object having a text attribute is used to achieve a similar effect.

Furthermore, it is also useful if the user can designate whether to set the "intermediate page print mode" for specific pages or a specific page (namely, in the unit of a page) in performing the setting via the UI illustrated in FIG. 7 or FIG. 8.

Third Exemplary Embodiment

A third exemplary embodiment of the present invention is described below. In the third exemplary embodiment of the present invention, a text object that cannot be visualized in the first and second exemplary embodiments can be visualized if the text object is to be converted into specific data, e.g., PDF data. The configuration of the image forming system according to the present exemplary embodiment is similar to that in the first exemplary embodiment.

FIG. 9 illustrates an example of drawing processing performed by the image forming apparatus 1500 on an object according to the present exemplary embodiment.

Referring to FIG. 9, example original image data 7001 includes four objects overlapping one another. The present exemplary embodiment is described below with respect to the following cases "Case 1, Case 2, and Case 3".

In Case 1, as illustrated in a table 7002, an attribute of the object OJA is text. The drawing order thereof is the third. An attribute of the object OJB is text. The drawing order thereof is the fourth.

An attribute of the object OJC is graphics or image different from text. The drawing order thereof is the second. An attribute of the object OJD is graphics or image different from text. The drawing order thereof is the first. That is, in Case 1, the text object A cannot be visualized because it is overwritten with the object OJB.

In Case 2, as illustrated in a table 7005, an attribute of the object OJA is text. The drawing order thereof is the third. An attribute of the object OJB is text. The drawing order thereof is the fourth. An attribute of the object OJC is text. The drawing order thereof is the second.

An attribute of the object OJD is graphics or image different from text. The drawing order thereof is the first. That is, in Case 2, a part of the text object C cannot be visualized because it is overwritten with the object OJA and the object OJB, and a part of the image object OJA cannot be visualized because it is overwritten with the object B.

In Case 3, as illustrated in a table 7009, an attribute of the object OJA is graphics or image different from text. The drawing order thereof is the third.

An attribute of the object OJB is text. The drawing order thereof is the fourth. An attribute of the object OJC is graphics or image different from text. The drawing order thereof is the second. An attribute of the object OJD is graphics or image different from text. The drawing order thereof is the first. That is, in this case, the text object OJB can be visualized because it is not overwritten with any other object.

A flow of processing performed in the image forming system according to the present exemplary embodiment is described below with reference to FIGS. 10A and 10B.

Each of FIGS. 10A and 10B is a flow chart illustrating an example of data generation processing performed in the image forming system according to the present exemplary embodiment. FIGS. 10A and 10B each illustrate an example of drawing processing performed by the image forming apparatus 1500.

The information processing apparatus 1001 performs the processing illustrated in FIG. 10A. The processing of step S8001 can be executed by the printer driver installed in the information processing apparatus 1001.

The image forming apparatus 1500 performs the processing illustrated in FIG. 10B. Processing in step S8002 through step S8010 can be performed with the CPU 1015 of the image forming apparatus 1500 by loading and executing a control program from the ROM 1003 on the RAM 1016.

Referring to FIG. 10A, at the start of the processing, the user operates the information processing apparatus 1001 to execute the application and generate print data 5001 desired to be printed.

Then, in step S8001, the user uses the printer driver installed in the information processing apparatus 1001 to perform various settings with respect to the print data. Then, the user presses a print key displayed on the UI, which is provided by the printer driver. Thus, the printer driver generates PDL data to be sent to the image forming apparatus 1500. Then, the printer driver transfers the generated PDL data to the image forming apparatus 1500.

In the example illustrated in FIG. 10A, the user has set "convert overwritten and invisible object into PDF" via the "intermediate page print mode" field as one of the various settings. Here, in the "intermediate page print mode", it can be prevented that an object overwritten with a text object becomes invisible due to the mutual overlapping of the objects.

The "intermediate page print mode" can be set via the driver setting screen of the information processing apparatus 1001 and via the UI screen of the image forming apparatus 1500. The driver setting screen and the UI screen of the image forming apparatus 1500 will be described in detail below.

Furthermore, the "intermediate page print mode" can be designated with respect to each page via the driver setting screen and the UI screen of the image forming apparatus 1500. With respect to the page to which the "intermediate page print mode" is not designated, processing described with respect to general image forming processing is performed. That is, in this case, the page to which the "intermediate page print mode" is not designated can be processed at a processing speed higher than that in the case of the page to which the "intermediate page print mode" is designated.

In step S8002 (FIG. 10B), the command analysis module 1004 of the image forming apparatus 1500 acquires information about the attribute (text or graphics or image different from text) and the drawing order with respect to each object based on the PDL data received from the information processing apparatus 1001.

Here, the information about the attribute and the drawing order with respect to each object corresponds to the attribute and the drawing order described in the table 7002 of Case 1 illustrated in FIG. 9. In Case 2, the information about the attribute and the drawing order with respect to each object corresponds to the attribute and the drawing order described in the table 7005. In Case 3, the information about the attribute and the drawing order with respect to each object corresponds to the attribute and the drawing order described in the table 7009.

In step S8003, the PDF generation module 1010 converts the object into PDF data according to the drawing order and stores the PDF data on the PDF data memory 1023 in the RAM 1016. The processing for converting the object into PDF data can be performed according to a publicly known method.

In step S8004, the PDF generation module 1010 determines whether the drawing order of the object converted into PDF data is the last. Whether the drawing order of the object converted into PDF data is the last can be determined based on whether a printing and rendering command has been received.

If it is determined in step S8004 that the drawing order of the object converted into PDF data is not the last (NO in step S8004), then the PDF generation module 1010 advances to step S8005. In step S8005, the PDF generation module 1010 determines whether the "intermediate page print mode" has been set. If it is determined in step S8005 that the "intermediate page print mode" has not been set (NO in step S8005), then the PDF generation module 1010 returns to step S8003. In step S8003, the same processing is repeatedly performed.

On the other hand, if it is determined in step S8005 that the "intermediate page print mode" has been set (YES in step S8005), then the PDF generation module 1010 advances to step S8006. In step S8006, the PDF generation module 1010 determines whether the objects overlap one another. The PDF generation module 1010 can easily determine whether the objects overlap one another by examining the drawing positions of the objects.

On the other hand, if it is determined in step S8006 that the objects do not overlap one another (NO in step S8006), then the processing returns to step S8003. In step S8003, the same processing is repeatedly performed.

On the other hand, if it is determined in step S8006 that the objects overlap one another (YES in step S8006), then the PDF generation module 1010 advances to step S8007. In step S8007, the PDF generation module 1010 determines whether the attribute of the overlapped object is text. If it is determined in step S8007 that the attribute of the overlapped object is graphics or image different from text (NO in step S8007), then the PDF generation module 1010 returns to step S8003. In step S8003, the same processing is repeatedly performed.

On the other hand, if it is determined in step S8007 that the attribute of the overlapped object is text (YES in step S8007), then the PDF generation module 1010 advances to step S8008. In step S8008, the PDF generation module 1010 stores PDF data obtained before the PDF generation module 1010 overlaps objects in the intermediate page information storage memory 1022.

In step S8009, the PDF generation module 1010 stores the PDF data that has been temporarily stored in the intermediate page information storage memory 1022 on the HDD 1031. Then, the processing return to step S8003 to repeat the above-described processing.

On the other hand, if it is determined in step S8004 that the drawing order of the object that has been converted into PDF data is the last (YES in step S8004), then the PDF generation module 1010 advances to step S8010. In step S8010, the PDF generation module 1010 stores the converted PDF data that has been temporarily stored on the PDF data memory 1023 on the 1031. Then, the processing ends.

As described above, according to the present exemplary embodiment, a similar effect as that in the first and second exemplary embodiments can be achieved even in the case of converting a text object that cannot be visualized in the first and second exemplary embodiments into PDF data.

Furthermore, according to the present exemplary embodiment, the PDF generation module 1010 can store PDF data 7003 obtained before text is made invisible due to the overlapping of objects in Case 1 (FIG. 9) on the HDD 1031. Furthermore, the PDF generation module 1010 can store PDF data 7004 obtained after the objects overlap one another on the HDD 1031 after storing the PDF data 7003 obtained before text is made invisible on the HDD 1031.

Furthermore, according to the present exemplary embodiment, the PDF generation module 1010 can store PDF data 7006 and 7007 obtained before text is made invisible due to the overlapping of objects in Case 2 (FIG. 9) on the HDD 1031. Furthermore, the PDF generation module 1010 can store PDF data 7008 obtained after the objects overlap one another on the HDD 1031 after storing the PDF data 7006 and 7007 obtained before text is made invisible on the HDD 1031.

Furthermore, according to the present exemplary embodiment, in Case 3 (FIG. 9), the text cannot be made invisible due to the overlapping of the objects. Accordingly, the PDF generation module 1010 can store PDF data 7010 on the HDD 1031 by performing conventional processing.

According to the present exemplary embodiment, the PDF generation module 1010 performs the PDF data conversion within the image forming apparatus 1500. However, the present exemplary embodiment can be implemented by performing the PDF conversion processing within the information processing apparatus 1001. In this case also, a similar effect can be achieved. Moreover, in this case, the present exemplary embodiment can be implemented by performing the processing other than the print processing performed by the image forming apparatus 1500 (FIG. 4, FIG. 6, and FIG. 10) with the printer driver installed in the information processing apparatus 1001.

The determination as to the attribute of each object and whether the objects overlap one another performed within the information processing apparatus 1001 can be performed using a publicly known method (refer to Japanese Patent Application Laid-Open No. 2006-243894).

Furthermore, in the above-described present exemplary embodiment, the PDF data converted by the PDF generation module is stored on the HDD. However, the present invention can be implemented by sending the data to the user using an image transmission function of the image forming apparatus 1500. In this case also, a similar effect can be achieved.

Furthermore, in the present exemplary embodiment, the mode for converting an object that has been overwritten with another object and thus has become invisible into PDF, namely, the "intermediate page print mode", is used in the case where a text object has been made invisible.

However, the "intermediate page print mode" can be applied in the case where the user has designated "highlighted text", "50% or larger part of text is invisible", "logo is invisible", "image is invisible", "colored text", "xx or more characters are invisible" ("xx" is an integer from 0 to 100), "xx % or larger part of logo is invisible" ("xx" is an integer from 0 to 100), or "xx % or larger part of image is invisible" ("xx" is an integer from 0 to 100). In this case also, a similar effect can be achieved.

Furthermore, in the present exemplary embodiment, the text object can be used in either of a case where text code is used or a case where an object having a text attribute is used to achieve a similar effect.

Furthermore, the present invention can be applied to the case where a file including an animation function (animation object) is converted into PDF data.

Fourth Exemplary Embodiment

A fourth exemplary embodiment of the present invention is described below. FIG. 11 illustrates an example of a UI displayed on the image forming apparatus 1500 according to the present exemplary embodiment. More specifically, FIG. 11 illustrates an exemplary intermediate page print mode setting screen.

Referring to FIG. 11, in an "intermediate page print mode" 11001, the user can perform a page designation 11002.

The "intermediate page print mode" includes two different modes. That is, the "intermediate page print mode" includes a "print" mode 11003 and a "convert into PDF" mode 11004. Furthermore, the user can select an object in the "intermediate page print mode". That is, the user can select either text 11005, logo 11011, and image 11014.

If the user has selected text 11005 via the intermediate page print mode setting screen, then the user can further select either "all text" 11006, "highlighted text" 11007, "colored text" 11008, "text invisibility ratio" 11009, or "number of invisible characters" 11010.

Furthermore, if the user has selected logo 11011, then the user can further designate a log data storage location with an absolute path 11012. In addition, the user can select a logo invisibility ratio 11013.

Furthermore, if the user has selected image 11014, then the user can further designate an image storage location with an absolute path 11015. In addition, the user can further select an image invisibility ratio 11016. Moreover, the user can further select a mode 11017 for providing a reduction layout to an intermediate page print image, which will be described in detail below.

Hereinbelow, processing is described for reducing an intermediate page to provide a layout in which one page includes a plurality of pages and outputting the page having the layout.

If the user has selected the mode 11017 for providing a reduction-layout to the intermediate page print image in the intermediate page print mode 11001, the user can reduce the intermediate page information to be printed, providing a layout in which a plurality of pages is included in one page, and print the page having the layout.

That is, it is enabled to print intermediate page information by reducing, at a reduction ratio of 50%, an image in which all of the objects overlap one another, namely, the data having a 2-up layout converted from data having a 1-up layout or the data having a 4-up layout converted from data having a 2-up layout, by executing a program stored in the image reduction layout module 1009 provided on the ROM 1003. In this case, the CPU 1015 executes the program stored on the image reduction layout module 1009 of the ROM 1003.

Hereinbelow, processing is described for reducing an intermediate page, providing a layout in which a plurality of is included in one page, and converting the data into PDF.

If the user has selected the mode 11017 for providing a reduction-layout to an intermediate page print image in the intermediate page print mode 11001, then the user can reduce the intermediate page information, provide a layout in which a plurality of pages is included in one page, and convert the data into PDF.

That is, it is enabled to convert intermediate page information into PDF by reducing, at a reduction ratio of 50%, an image in which all of the objects overlap one another, namely, the data having a 2-up layout converted from data having a 1-up layout or the data having a 4-up layout converted from data having a 2-up layout, by executing a program stored in the image reduction layout module 1009 provided on the ROM 1003. In this case, the CPU 1015 executes the program stored on the image reduction layout module 1009 of the ROM 1003.

In the present exemplary embodiment, both objects before overlapping and objects after overlapping are printed according to the drawing order. However, the present invention can also be implemented even if a display unit outputs such objects.

Furthermore, even if an output unit other than a display unit is used as a device that outputs objects, the present invention can also be implemented if the output unit renders the objects and outputs the rendered objects.

Fifth Exemplary Embodiment

FIG. 12 is a memory map of a storage medium that stores various data processing programs that can be read by the image forming apparatus 1500 according to an exemplary embodiment of the present invention.

Although not shown in FIG. 12, information for managing the programs stored in the storage medium, such as version information and information concerning the creator of a program, for example, can be stored in the storage medium. In addition, information that depends on an operating system (OS) of an apparatus that reads the program, such as an icon for identifying and displaying the program, can be stored in the storage medium.

In addition, data that is subordinate to the various programs is also managed in a directory of the storage medium. In addition, a program for installing the various programs on a computer can be stored in the storage medium. In addition, in the case where a program to be installed is compressed, a program for decompressing the compressed program can be stored in the storage medium.

In addition, the functions according to the above-described exemplary embodiments illustrated in FIGS. 4A and 4B, FIGS. 6A and 6B, and FIGS. 10A and 10B can be implemented by a host computer using a program that is externally installed. In this case, the present invention is applied to the case where a group of information including a program is supplied to an output device from a storage medium, such as a CD-ROM, a flash memory, and a floppy disk (FD) or from an external storage medium via a network.

The present invention can also be achieved by providing a system or an apparatus with a storage medium storing program code of software implementing the functions of the embodiments and by reading and executing the program code stored in the storage medium with a computer of the system or the apparatus (a CPU or a micro processing unit (MPU)).

In this case, program code in itself read by a storage medium implements functions of exemplary embodiments of the present invention, and the storage medium that stores the program code implements the present invention.

Accordingly, the program can be configured in any form, such as object code, a program executed by an interpreter, and script data supplied to an OS.

As the storage medium for supplying such program code, a flexible disk, a hard disk, an optical disk, a magneto-optical disk (MO), a compact disc read-only memory (CD-ROM), a compact disc recordable (CD-R), a compact disc rewritable (CD-RW), a magnetic tape, a nonvolatile memory card, a read-only memory (ROM), and a digital versatile disc (DVD (DVD-recordable (DVD-R), DVD-rewritable (DVD-RW))), for example, can be used.

In this case, the program code itself, which is read from the storage medium, implements the function of the embodiments mentioned above, and accordingly, the storage medium storing the program code constitutes the present invention.

The above program can also be supplied by connecting to a web site on the Internet by using a browser of a client computer and by downloading the program from the web site to a storage medium, such as a hard disk. In addition, the above program can also be supplied by downloading a compressed file that includes an automatic installation function from the web site to a storage medium, such as a hard disk. The functions of the above embodiments can also be implemented by dividing the program code into a plurality of files and downloading each divided file from different web sites. That is, a World Wide Web (WWW) server or a file transfer protocol (ftp) server for allowing a plurality of users to download the program file for implementing the functional processing configures the present invention.

In addition, the above program can also be supplied by distributing a storage medium, such as a CD-ROM and the like, which stores the program according to the present invention after an encryption thereof, by allowing the user who is qualified for a prescribed condition to download key information for decoding the encryption from the web site via the Internet, and by executing and installing on the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

As described above, according to exemplary embodiments of the present invention, it is enabled to output both an object having a specific attribute that is to be overwritten with another object in a drawing order and thus may become invisible and an overwritten object in the case of performing print processing of data including a plurality of objects overlapping one another.

Furthermore, according to exemplary embodiments of the present invention, in the case of storing data obtained by converting data including a plurality of objects overlapping one another into specific data, it is enabled to store both an object before overwriting and an object after overwriting.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-229392 filed Sep. 4, 2007, which is hereby incorporated by reference herein in its entirety.

What is claimed is:

1. A printing control apparatus comprising:
a receiving unit configured to receive page description language (PDL) data specifying an attribute and a rendering order for each of a plurality of objects;
an overlap determination unit configured to determine whether an object designated with a specific attribute is to be overlapped by a different object;
a determination unit configured to determine, when the overlap determination unit determines that the object is to be overlapped by the different object, whether to print an intermediate page including the object and a designated overlapping ratio necessary for printing the intermediate page according to the PDL data;
a rendering unit configured to render the intermediate page having the object before being overlapped by the different object and to render a final page having the object before being overlapped by the different object when determination unit determines that the object is to be overlapped by the different object with an overlapping ratio no smaller the designated overlapping ratio; and
a transfer unit configured to transfer the rendered intermediate page and the rendered final page to a printer.

2. The printing control apparatus according to claim 1, further comprising:
a last object determining unit configured to determine whether the object is a last object to be rendered;
wherein the transfer unit transfer the rendering data to the printer when the last object determining unit determines that the object is the last object.

3. The printing control apparatus according to claim 1, wherein the transfer unit performs a first transfer to transfer rendering data where a first object and a second object overlap to the printer;
performs a second transfer after the first transfer to transfer rendering data where the first object, the second object and a third object overlap to the printer; and
performs a third transfer after the second transfer to transfer rendering data where the first object, the second object, the third object and a fourth object overlap to the printer.

4. The printing control apparatus according to claim 1, wherein the specific attribute includes one of a character, a logo, and an image.

5. The printing control apparatus according to claim 4, further comprising a display unit configured to display a setting screen in response to a selection of an intermediate page print mode, the setting screen includes selections items of designating the intermediate pages having a character object, a logo object, and an image object, respectively.

6. The printing control apparatus according to claim 5, wherein the setting screen displayed by the display unit includes a selection item for rendering the intermediate page in a reduction layout for the intermediate page having any of the character, logo, and image objects before being overlapped by the different object, and wherein the rendering unit renders the designated intermediate page in the reduction layout in a case where the rendering in the intermediate page in the reduction layout is selected in the setting screen.

7. A method comprising:
receiving page description language (PDL) data specifying an attribute and a rendering order for each of a plurality of objects;
determining whether an object designated with a specific attribute is to be overlapped by a different object;
determining, when it is determined that the object is to be overlapped by the different object, whether to print an intermediate page having the object and a designated overlapping ratio necessary to print the intermediate page;
rendering the intermediate page and a final page having the object before the object is overlapped by the different object when it is determined that the object is to be overlapped by the different object with an overlapping ratio no smaller than the designated overlapping ratio; and
transferring the rendered intermediate page and the rendered final page to a printer.

8. The method according to claim 7, further comprising:
determining whether the object is a last object to be rendered;
wherein the transferring step comprises transferring the rendering data to the printer when it is determined that the object is the last object.

9. The method according to claim 7,
wherein the transferring step comprises performing a first transfer to transfer rendering data where a first object and a second object overlap the printer;
performing a second transfer after the first transfer to transfer rendering data where the first object, the second object and a third object overlap to the printer; and
performing a third transfer after the second transfer to transfer rendering data where the first object, the second object, the third object and a fourth object overlap the printer.

10. A non-transitory computer-readable storage medium storing instructions which, when executed by an apparatus, cause the apparatus to perform operation comprising:
receiving page description language (PDL) data specifying an attribute and a rendering order for each of a plurality of objects;
determining whether an object designated with a specific attributed is to be overlapped by a different object;
determining, in a case where it is determined that the object overlaps the different object, whether to print an intermediate page having the object designated with the specific attribute and a designated overlapping ratio necessary for printing the intermediate page;
rendering the intermediate page and a final page having the object before the object is overlapped by the different object when it is determined that the object is to be overlapped by the different object with an overlapping ratio no smaller than the designated overlapping ratio.

11. The non-transitory computer-readable storage medium according to claim 10, further comprising:

determining whether the object is a last object to be rendered;
wherein the transferring step comprises transferring the rendering data to the printer when it is determined that the object is the last object.

12. The non-transitory computer-readable storage medium according to claim 10,
wherein the transferring step comprises performing at a first transfer to transfer rendering data where a first object and a second overlap to the printer;

performing a second transfer after the first transfer rendering data where the first object, the second object and a third object overlap to the printer; and performing a third transfer after the second transfer to transfer rendering data where the first object, the second object, the third object and a fourth object overlap to the printer.

* * * * *